US011104773B2

United States Patent
Cartwright et al.

(10) Patent No.: US 11,104,773 B2
(45) Date of Patent: Aug. 31, 2021

(54) POLYMER COMPOSITES POSSESSING IMPROVED VIBRATION DAMPING

(75) Inventors: Craig Cartwright, Jacksonville, FL (US); Joshua Hernandez, Ponte Vedra, FL (US); Nathan Edward Hornig, Jacksonville, FL (US)

(73) Assignee: Goodrich Corporation, Charlotte, NC (US)

( * ) Notice: Subject to any disclaimer, the term of this patent is extended or adjusted under 35 U.S.C. 154(b) by 160 days.

(21) Appl. No.: 13/495,633

(22) Filed: Jun. 13, 2012

(65) Prior Publication Data

US 2012/0313307 A1 Dec. 13, 2012

Related U.S. Application Data

(60) Provisional application No. 61/496,547, filed on Jun. 13, 2011.

(51) Int. Cl.
*F16F 9/30* (2006.01)
*C08J 5/24* (2006.01)
(Continued)

(52) U.S. Cl.
CPC .............. *C08J 5/24* (2013.01); *B29C 70/88* (2013.01); *C08J 5/042* (2013.01); *C08J 5/043* (2013.01);
(Continued)

(58) Field of Classification Search
CPC ...................................................... F16F 9/306
(Continued)

(56) References Cited

U.S. PATENT DOCUMENTS 4,034,639 A * 7/1977 Caldwell ........................ 83/835
5,176,580 A * 1/1993 Stamm .................... F16F 9/306
474/101

(Continued)

FOREIGN PATENT DOCUMENTS

DE 33 37 526 A1 5/1984
DE 10 2005 00305 A1 7/2006
(Continued)

OTHER PUBLICATIONS

International Search Report and Written Opinion from related International Application No. PCT/US2012/042282, dated Sep. 4, 2012, in 11 pages.
(Continued)

*Primary Examiner* — Bradley T King
(74) *Attorney, Agent, or Firm* — Snell & Wilmer L.L.P.

(57) ABSTRACT

Fiber-reinforced polymer composites possessing improved damping ability are provided. In one aspect, the fibers provide the composite with a relatively high dynamic modulus over a broad range of frequencies for a given temperature. In another aspect, the polymer may comprise a viscoelastic polymer possessing a relatively high loss factor for a given frequency and temperature. The polymer may be further tailored to control the center frequency at which the maximum loss factor of the polymer is achieved. The composite so formed exhibits a relatively small reduction in loss factor with significant increase in dynamic modulus over a broad range of frequencies for a given temperature. As a result, a structure damped by the composite exhibits a relatively high, constant loss factor as compared to conventional damping materials. Thus, embodiments of the disclosed composites dissipate significantly more energy during each vibration cycle than conventional damping materials.

16 Claims, 26 Drawing Sheets

(51) Int. Cl.
*C08J 5/04* (2006.01)
*B29C 70/88* (2006.01)
*B29K 19/00* (2006.01)

(52) U.S. Cl.
CPC ........... *C08J 5/046* (2013.01); *B29K 2019/00* (2013.01); *B29K 2995/0091* (2013.01); *C08J 2321/00* (2013.01)

(58) Field of Classification Search
USPC ................... 267/141, 141.1, 140.5; 188/268
See application file for complete search history.

(56) References Cited

U.S. PATENT DOCUMENTS

| | | | | |
|---|---|---|---|---|
| 5,759,113 | A | * | 6/1998 | Lai et al. ........................ 473/321 |
| 5,875,589 | A | * | 3/1999 | Lai et al. ............................. 52/1 |
| 5,902,656 | A | * | 5/1999 | Hwang ....................... 428/36.91 |
| 6,017,281 | A | * | 1/2000 | Behling ............. A63B 53/0487 473/313 |
| 6,309,985 | B1 | | 10/2001 | Virnelson et al. |
| 6,680,349 | B2 | | 1/2004 | Zhang et al. |
| 6,764,754 | B1 | | 7/2004 | Hunter et al. |
| 6,831,876 | B1 | * | 12/2004 | Cartwright .................... 367/152 |
| 7,785,701 | B2 | | 8/2010 | Noguchi et al. |
| 2004/0092330 | A1 | * | 5/2004 | Meyer .................... A63B 53/10 473/318 |
| 2007/0071957 | A1 | | 3/2007 | Atkins et al. |
| 2007/0100060 | A1 | * | 5/2007 | Tahri et al. .................... 524/502 |
| 2007/0101679 | A1 | | 5/2007 | Harthcock et al. |
| 2007/0128960 | A1 | | 6/2007 | Ghasemi Nejhad et al. |
| 2008/0277057 | A1 | | 11/2008 | Montgomery et al. |
| 2009/0326140 | A1 | | 12/2009 | Shimada et al. |

FOREIGN PATENT DOCUMENTS

| | | | |
|---|---|---|---|
| EP | 1210962 | | 11/2001 |
| EP | 1210962 A2 | * | 6/2002 ............. A63B 53/10 |

OTHER PUBLICATIONS

Office Action dated Sep. 28, 2015 in Chinese Application No. 201280039472.7.
Second Office Action dated Jun. 13, 2016 in Chinese Application No. 201280039472.7.
Office Action dated Aug. 28, 2017 in Chinese Application No. 201280039472.7.
Intellectual Property of India, Examination Report dated Nov. 27, 2018 in Application No. 107641/DELNP/2013.
Office Action dated Dec. 30, 2016 in Chinese Application No. 201280039472.7.

* cited by examiner

POLYMER COMPOSITES POSSESSING IMPROVED VIBRATION DAMPING

CROSS-REFERENCE TO RELATED APPLICATIONS

This application claims the benefit of priority of U.S. Provisional Patent Application No. 61/496,547, entitled "POLYMER COMPOSITES HAVING IMPROVED FLEXURAL VIBRATION DAMPING", filed on, Jun. 13, 2011. The entirety of this application is hereby incorporated by reference and should be considered a part of this specification.

BACKGROUND

Field

Embodiments of the present disclosure pertain to vibration damping and, in particular, to polymer matrix composites that provide improved mechanical damping while retaining good mechanical and thermal properties.

Description of the Related Art

Vibration is commonly encountered in moving mechanical systems. In one example, automobiles experience vibration during operation due to variations in the surface of the road. In another example, cameras may vibrate when motion takes place around the mount to which the camera is attached.

Controlling the degree to which a structure vibrates may be desirable for a number of reasons. In one aspect, mechanical vibrations may result in perceptible noise and/or motion. In the context of consumer products, noise or motion associated with vibration may be distracting and uncomfortable to a customer. This in turn may lead to a perception of poor quality of the product. For example, vibrations in automobiles are desired to be kept as low as possible in order to provide a more pleasant driving experience. In another aspect, the oscillatory deformation associated with mechanical vibrations may lead to mechanical failure in a vibrating structure due to high cycle fatigue. In another example, vibrations may induce undesirable acoustic levels in aircraft, rotor craft or marine vessels.

A variety of approaches have been adopted to increase damping in vibrating systems. Typically, these approaches apply a vibration damping material to an area of a vibrating system, where the vibration damping material attenuates the vibrations. For example, viscoelastic polymers are often employed in vibration damping applications.

In general, the amount of damping provided by a viscoelastic material at a given temperature and frequency is dictated by the dynamic modulus and loss factor of the viscoelastic material. The dynamic modulus is a measure of the stiffness of the viscoelastic material under vibratory conditions, while the loss factor is a parameter related to the viscoelastic damping of the material. As a rule of thumb, as the dynamic modulus of the viscoelastic material increases, more of the mechanical energy of vibration is stored in the viscoelastic material per vibration cycle, while as the loss modulus of the viscoelastic material increases, a greater portion of the stored mechanical energy is dissipated. Thus, a high dynamic modulus and a high loss factor each favor high energy dissipation in viscoelastic materials.

However, the loss factor of a viscoelastic material is not independent of the dynamic modulus. For example, when the dynamic modulus of a viscoelastic material is increased, the loss factor decreases precipitously beyond a certain modulus level. It is further observed that the reduction in damping due to the reduced loss factor is not compensated for by the increase in dynamic modulus. As a result, the net effect of increasing the dynamic modulus is a reduction in the amount of damping provided in a unit volume of the viscoelastic material.

While the amount of damping material employed in a damping application may be increased to compensate for the reduction in the damping per unit volume of the viscoelastic material, this approach is problematic. In one aspect, adding more damping material to reduce vibrations occurring in a structure increases the cost of the viscoelastic material used. In another aspect, adding more damping material to reduce vibrations occurring in a structure increases the total weight or size of the structure. Either cost, weight or size increases may be prohibitive in certain applications.

Therefore, there exists an ongoing need for damping materials that provide improved mechanical vibration damping while remaining relatively light weight and also retaining acceptable mechanical properties.

Poisson's ratio is a natural characteristic of materials. When a homogeneous material is stretched (tensile strain) in one direction, it tends to contract (compression strain) in the other two directions perpendicular to the direction of tension. Poisson's ratio is the ratio of the negative compression strain divided by the tensile strain, for small values of these changes. The theoretical maximum Poisson's ratio for a homogeneous material is 0.5. Materials with exceptional Poisson's ratios (e.g., greater than 0.5) may have useful properties.

Thermal expansion is a natural characteristic of materials. Most materials expand as temperature increases. Different materials have different expansion rates. The coefficient of linear expansion is a measurement of length increase per degree of temperature increase.

Controlling thermal expansion is desirable in many applications. For example, thermal expansion can alter the deform measurement tools, creating measurement error. In another example, temperature changes can lead to residual stress and deformation when dissimilar materials with different coefficients of linear expansion are bonded together. In another aspect, a designer may exploit this residual stress to induce motion as of an actuator.

Therefore, there exists an ongoing need for materials with negative coefficients of linear expansion to counteract and/or contrast the thermal deformation of conventional materials.

SUMMARY

Embodiments of the present invention involve several features pertaining to vibration damping. Without limiting the scope of this invention, its more prominent features will be discussed briefly. After considering this discussion, and particularly after reading the Detailed Description section below in combination with this section, one will understand how the features and aspects of these embodiments provide several advantages over prior damping systems and methods.

One aspect of the disclosed embodiments is the combination, linkage and use of non-obvious parameters. Certain embodiments seek to increase system loss factor with a strategy that reduces material loss factor (e.g., as part of a tradeoff with dynamic modulus). For example, when an elastomer matrix with a high loss factor is reinforced with fibers, the resulting composite may have a lower material loss factor, offset by a higher dynamic shear modulus, relative to the viscoelastic matrix. In many applications, the resulting fiber-reinforced elastomer composite structure may be more effective (e.g., structure may have a higher system loss factor) than if treated with the unreinforced elastomer.

Another aspect of the disclosed embodiments is the exploitation of Poisson's ratios higher than 0.5, which is a value that is theoretically impossible with homogeneous materials. Certain embodiments exhibit exceptionally high Poisson's ratios to increase system loss factor. A "strain magnification effect" is disclosed in which materials with exceptionally high Poisson's may possess exceptional damping properties in certain embodiments.

Another aspect of the disclosed embodiments is the exploitation of Poisson's ratios greater than 0.5 to create composite materials with a negative coefficient of linear thermal expansion in certain embodiments.

Another aspect of the present invention is a composite material that comprises a plurality of fiber-reinforced elastomer composite layers having an elastomer and a plurality of fibers positioned within the elastomer. The composite material possesses a maximum shear loss factor greater than about 0.5 and a real portion of the dynamic shear modulus value G' greater than about $1 \times 10^4$ psi at the maximum shear loss factor. Certain embodiments of this invention may possess a Poisson's ratio greater than 0.5. Furthermore, certain embodiments of this invention may possess a negative coefficient of linear expansion.

Another aspect of the disclosed embodiments is a structure incorporating fiber-reinforced elastomer composite layers to increase damping, increase compliance and/or control thermal expansion.

Another aspect of the disclosed embodiments is a fiber-reinforced composite material that comprises an elastomer and a first plurality of fibers positioned within the elastomer. The composite material possesses a maximum Young's loss factor greater than 0.15 and a real portion of the dynamic Young's modulus value E' greater than $2 \times 10^5$ psi at the maximum Young's loss factor.

Another aspect of the disclosed embodiments is a method for fabricating a composite. The method comprises infiltrating an elastomer into a plurality of fibers to form a fiber-reinforced elastomer layer, stacking a plurality of the fiber-reinforced elastomer layers, and curing the plurality of fiber-reinforced elastomer layers to form a fiber-reinforced elastomer composite. The composite possesses a maximum shear loss factor greater than about 0.5 and a real portion of the dynamic shear modulus value G' greater than about $1 \times 10^4$ psi at the maximum shear loss factor.

DETAILED DESCRIPTION

Figure 1:
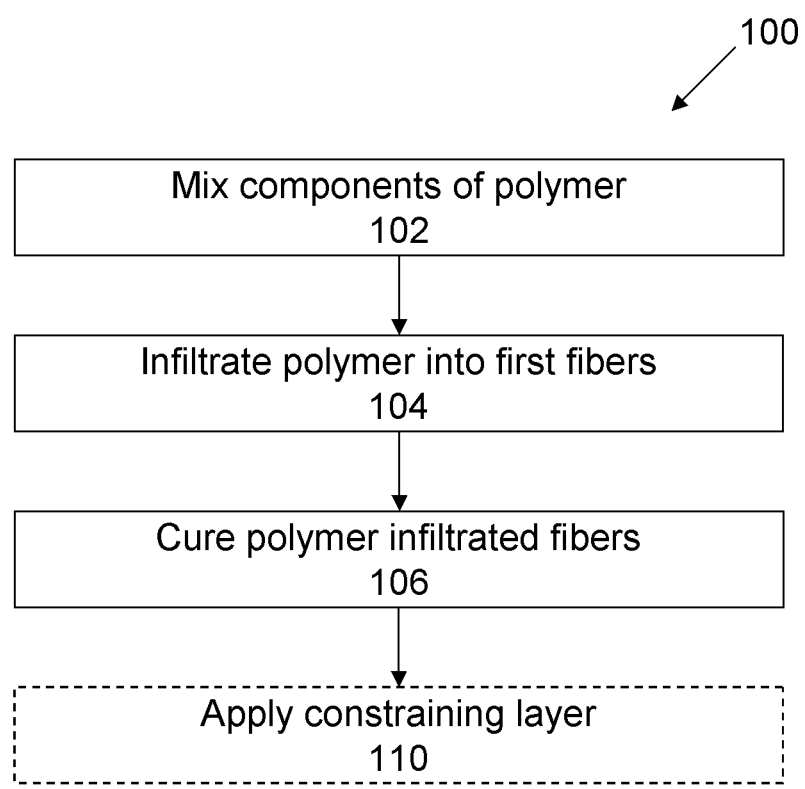
FIG. 1 is a schematic illustration of an embodiment of a method of making polymer composites of the present disclosure.

Embodiments of the present disclosure provide fiber-reinforced polymer composites possessing improved damping ability. In one aspect, the fibers may be configured to provide the composite with a relatively high dynamic modulus over a broad range of frequencies for a given temperature. In another aspect, the polymer may comprise a viscoelastic polymer configured to possess a relatively high loss factor for a given frequency and temperature. The polymer may be further tailored to control the center frequency at which the maximum loss factor of the polymer is achieved. The composite formed from the fiber and modulus so configured exhibits a relatively small reduction in loss factor with significant increase in dynamic modulus over a broad range of frequencies for a given temperature. As a result, when employed to damp vibrations in a structure, the damped system (composite and structure) exhibits a relatively high loss factor that is substantially constant, as compared to conventional damping materials. Thus, embodiments of the disclosed composites dissipate significantly more energy during each vibration cycle than conventional damping materials. To better appreciate the advantages and benefits of the disclosed composites, energy dissipation in viscoelastic materials is discussed in brief below.

In general, the degree of damping provided by a viscoelastic material may be strongly influenced by the dynamic modulus of the material and the loss factor of the material. In a material undergoing vibration (i.e., oscillatory motion), the ratio of stress to strain is given by the dynamic modulus. Using a hysteretic model of viscoelasticity, where damping is assumed to be proportional to strain and independent of rate, the dynamic modulus of a viscoelastic material may be represented mathematically by Equation 1:

$$E(T,f) = E_1 + iE_2 = E_1(1+i\eta) \quad (1)$$

where E(T,f) is the dynamic modulus, as a function of temperature and frequency, $E_1$ is the storage modulus of the structure, $E_2$ is the loss modulus of the structure, i is the imaginary unit, and η is the loss factor, which may also be expressed as $E_2/E_1$.

As illustrated in Equation 1, the dynamic modulus is expressed as a complex equation, where the storage modulus is the real portion and the loss modulus is the imaginary portion. The storage modulus relates to the elastic behavior of the material and characterizes its stiffness. The loss modulus relates to the viscous behavior of the material and characterizes its energy dissipation ability. Notably, in general, the dynamic modulus of a material increases as its storage modulus (i.e., stiffness) increases.

The dynamic modulus and loss factor may be influenced not only by the viscoelastic material but also environmental and loading conditions. For example, changes in temperature (T) and/or frequency (f) significantly influence dynamic modulus and loss factor. Thus, the damping behavior of embodiments of the disclosed composites may be discussed in the context of temperature and/or frequency. However, it may be understood that the scope of the disclosed embodiments are not limited to temperature and frequency but may include any parameter that exerts an influence upon the dynamic modulus and loss factor.

The amount of energy dissipated by the viscoelastic material on unloading during a vibrational cycle, D, is proportional to both the loss factor η and the total amount of mechanical energy stored by the viscoelastic material during loading, U (Equation 2).

$$D \propto \eta, U \qquad (2)$$

In general, the energy U increases with increasing dynamic modulus of the material. The dynamic modulus also increases with the storage modulus of the material. Thus, the energy U increases with increasing storage modulus. In contrast, the loss factor decreases with increasing storage modulus. Thus, the amount of energy D dissipated by the viscoelastic material as the dynamic modulus of the material depends upon competition between the decrease in the loss factor and the increase in the stored energy. If the amount by which the stored energy increases with a given change in dynamic modulus is greater than the amount by which the loss factor decreases, the net effect is an increase in dissipated energy. Conversely, if the amount by which the stored energy increases with a given change in dynamic modulus is less than the amount by which the loss factor decreases, the net effect is a decrease in dissipated energy.

As discussed in greater detail below, embodiments of the disclosed composites comprise one or more layers of a viscoelastic polymer matrix (e.g., an elastomer) reinforced with a plurality of fibers. The resulting composite, possessing a high loss factor and high modulus, may provide an improvement in mechanical damping while maintaining desired mechanical properties (e.g., modulus, strength, etc.). For example, when coupled with a vibrating structure, the composite provides a significant increase in the loss factor of the composite as compared to conventional matrix materials, such as epoxies and vinyl ester resins. These and other advantages of the disclosed embodiments are described in detail below.

In the description that follows, the damping properties of the composite (e.g., loss factor, dynamic modulus, etc.) may be referred to as material or composite properties. Properties of the system formed by attachment of the composite to an underlying structure may be referred to as system properties.

Embodiments of the damping composite may be applied to a single surface of a structure (e.g., a beam). When the composite is attached to a single side of the beam structure, deformation of the beam structure may be referred to as extensional. When the beam is bent under these conditions, the composite will undergo extension and compression generally along the direction of the longitudinal axis of the beam structure (e.g., $E_{11}$) owing to the asymmetry of the composite-structure system. As a result, the damping properties of the composite are dominated by the dynamic Young's modulus (e.g., tensile storage modulus and tensile loss modulus) of the composite.

In contrast, when the composite is attached between two beams, deformation of the beam structure may be referred to as constrained. When the beam is bent under these conditions, the composite will undergo shear owing to the symmetry of the composite-structure system. As a result, the damping properties of the composite are dominated by the dynamic shear modulus, $G_{13}$, of the composite (e.g., shear storage modulus and shear loss modulus).

The fibers of the composite may be configured so as to provide a relatively high dynamic modulus, in either tension or shear. In certain embodiments, one or more parameters of the fibers may be selected in order to adjust the material dynamic modulus, including, but not limited to, the fiber composition, the fiber architecture, the fiber orientation, and the relative concentration of the fibers to the matrix. In certain embodiments, the fibers may include carbon, graphite, glass, E-glass, S-glass, polymer (such as nomex, aramid, polyethylene, ultra high molecular weight polyethylene (UHMW), polypropylene, polyester, nylon, polyamide, poly-p-phenylene-benzobisoxazole (PBO), Innegra®, Kevlar®, Spectra®, thermosets, thermoplastics, or combinations thereof), composite, fiberglass, oxide, ceramic, silicon carbide, Nextel®, quartz, metal (such as boron, steel or stainless steel) fibers. However, it may be understood that other fibers may be employed without limit.

In other embodiments, the composition of the elastomer matrix may be configured such that the elastomer exhibits a relatively high loss factor. In further embodiments, the composition of the elastomer may be tailored so that the maximum loss factor for a given temperature occurs at a selected center frequency. In this manner, the center frequency of the composite may be controlled. As discussed in greater detail below, in certain embodiments, the elastomer may comprise polyurethanes. However, other elastomers may be employed without limitation.

In additional embodiments, ranges of the dynamic modulus and loss factor of the polymer composite have been identified over which the damping behavior (e.g., loss factor) of a system having an embodiment of the composite applied to a structure undergoing vibration are significantly improved over conventional damping materials. For example, improved damping performance is found in constrained loadings when the composite material possesses a maximum shear loss factor greater than 0.5 and a real portion of the dynamic shear modulus value G' (e.g., $G_{13}$) greater than about $1 \times 10^4$ psi at the maximum shear loss factor. In another example improved damping performance is found in extensional loadings when the composite material possesses a maximum Young's loss factor greater than 0.15 and a real portion of the dynamic Young's modulus value E' (e.g., $E_{11}$) greater than about $2 \times 10^5$ psi at the maximum Young's loss factor (FIG. 9).

For example, as illustrated in the examples below, an embodiment of the disclosed composites, a carbon-fiber reinforced-polyurethane composite having a dynamic shear modulus and loss factor within the ranges disclosed above was attached to an aluminum beam in a constrained configuration. The system loss factor of the composite-aluminum beam was approximately four times greater than a comparable aluminum beam damped with state-of-the-art damping tile. Furthermore, this improvement in vibration damping was observed for vibration modes ranging between about 10 Hz to at least about 3000 Hz. In further embodiments, vibration damping of vibration modes less than about 10 Hz and/or greater than about 3000 Hz may be obtained. As the Young's modulus of the composite was observed to increase with frequency, this result indicates that the decrease in the energy damping capability due to reduction in the material loss factor were offset by a corresponding increase in the amount of stored energy.

Optionally, a constraining layer may also be applied to at least a portion of at least one surface of the polymer composite system. In an embodiment, the constraining layer may comprise one or more layers of a carbon fiber-reinforced epoxy. In certain embodiments, one or more of the fiber material, the fiber architecture, the fiber orientation, and the relative concentration of the fibers to the polymer matrix within the constraining layer may be adjusted to increase or decrease the modulus and loss factor of the polymer composite, as desired.

FIG. 1 illustrates one embodiment of a process 100 of manufacturing a polymer composite that provides improved vibration damping. It may be understood that the process 100 may include greater or fewer operations and the operations may be performed in an order different than that illustrated in FIG. 1, without limit.

The process 100 includes forming a plurality of layers of the polymer composite system in blocks 102-106. In block 102, the components of a selected polymer may be mixed together. In block 104, the polymer may be infiltrated into a plurality of fibers. In block 106, the polymer and the plurality of fibers may be at least partially cured to form a layer (e.g., a lamina) of the polymer composite. Optionally, one or more constraining layers may also be applied to at least a portion of the surface of the exterior layers of composite in block 110 to impart additional stiffness to the composite.

Embodiments of the polymer may include elastomers. Examples of the elastomers may include, but are not limited to, polyurethanes, polyureas, rubbers, thermoplastic elastomers, plasticized polymers (e.g., plasticized epoxies), silicones, and polyvinyl chlorides. In further embodiments, the elastomer may be selected so as to possess a processing temperature range between about room temperature to less than or equal to about 250° F.

In another embodiment, a vacuum infusion process (e.g., VARTM) may be employed if the viscosity of the elastomer is low enough (e.g., less than or equal to about 300 cp at about the processing temperature). In an alternative embodiment, the elastomer may be selected such that the viscosity of the elastomer is within the range between about 100 cp to about 300 cp at about the processing temperature. However, other viscosities may be employed without limit.

Embodiments of the polyurethane may be formed through reaction of a diisocyanate with a polyol. The diisocyanate and polyol may be provided in a stoichiometric ratio according to equivalent weights of the respective components. In further embodiments, an excess of the diisocyanate may be provided to allow for substantially complete reaction of the polyol. The diisocyanate may include aliphatic and aromatic compounds. Examples of the diisocyanate may include, but are not limited to, toluene diisocyanate (TDI), methylene diphenyl 4,4'-diisocyanate (MDI), hexamethylene diisocyanate (HDI), isophorone diisocyanate (IPDI), and the like. Examples of the polyol may include, but are not limited to, diols, triols, polypropylene glycol (PPG), polytetramethyl ether glycol (PTMEG), polycarbonate diols, polyester polyols, hydroxy-terminated butadienes, and the like.

Embodiments of the polyurea may be formed through reaction of an isocyanate with an amine. The isocyanate may react with the amine in a stoichiometric ratio according to equivalent weights of the respective components. In further embodiments, an excess of the isocyanate may be provided to allow for substantially complete reaction of the amine. The isocyanate may include aromatic and aliphatic isocyanates. Examples of the isocyanate may include, but are not limited to, toluene diisocyanate (TDI), methylene diphenyl 4,4'-diisocyanate (MDI), hexamethylene diisocyanate (HDI), isophorone diisocyanate (IPDI), and the like. The polyamines may be aliphatic and aromatic. Examples of the polyamines may include, but are not limited to, ethylene diamine, 1,3 diaminopropane, amine terminated polyols and hexamethylenediamine.

In certain embodiments, the maximum loss factor of the elastomer may be adjusted to change the loss factor of the composite. For example, the loss factor of the elastomer may be configured to be as high as possible at a selected temperature and frequency of interest so as to increase the loss factor of the composite. In other embodiments, the maximum loss factor of the elastomer may be configured to fall within a selected range at a selected temperature and frequency of interest. In one example, in one embodiment, the shear loss factor of the elastomer may be configured to be greater than or equal to about 0.5 (e.g., about 1). The frequency range of interest may be selected between about 1 Hz to about 100,000 Hz, about 10 Hz to about 10,000 Hz, about 50 Hz to about 10,000 Hz. The temperature range of interest may be between about −50° C. to about 250° C., about −50 to about 100° C., about −5° C. to about 40° C., about 5° C. to about 30° C.

Figure 3:
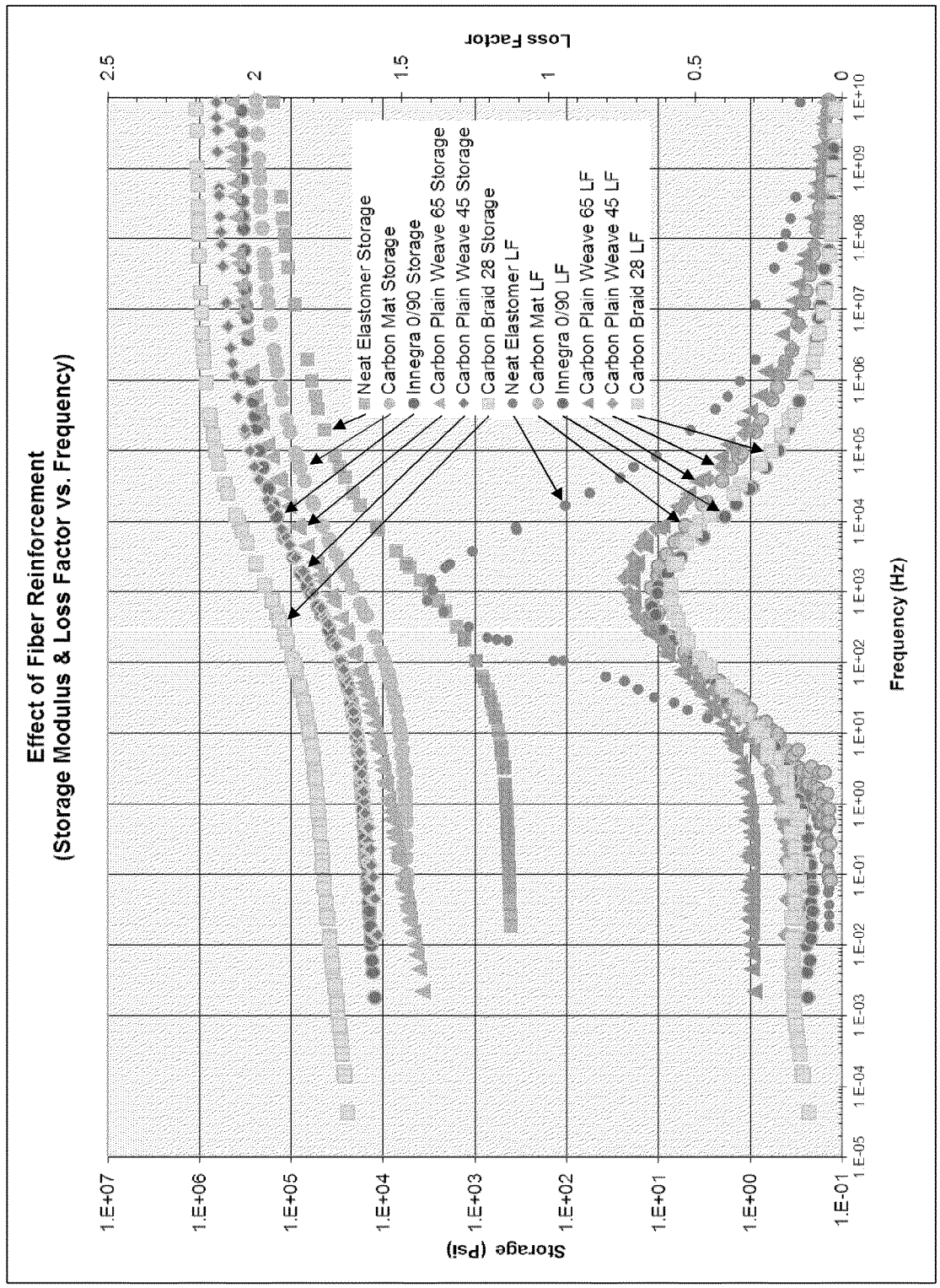
FIG. 3 is a plot of storage modulus and loss factor as a function of frequency for embodiments of the polymer composite of FIG. 1 and a comparative elastomer alone.

In further embodiments, the stiffness and orientation of the fibers may be varied in order to change the dynamic modulus and loss factor of the composite. For example, in general, changes in the composition, configuration (e.g., continuous or discontinuous, 1-, 2-, 3-dimensional, type of weave, etc.), and/or angle of orientation of the fibers which result in an increase in the stiffness of the composite may reduce the composite loss factor. Accordingly, by varying one or more of the composition and/or configuration of the fibers, the composite loss factor may be adjusted. The impact of fiber architecture is shown in FIG. 3.

In operation 104, the elastomer may be impregnated into a dry preform of the selected plurality of fibers, using either vacuum only or pressure and vacuum to form a composite layer. In an embodiment, the elastomer may be present in a concentration varying within the range between about 30 vol. % to about 70 vol. % (e.g., about 40 vol. % to about 70 vol. %), on the basis of the volume of the composite layer to be formed. In certain embodiments, the fiber parameters may be selected such that the composite exhibits a selected dynamic modulus value that improves the damping properties of the composite. Embodiments of the fiber parameters may include, but are not limited to, fiber composition, fiber orientation, fiber weave, and the relative concentration of fibers within the composite (e.g., fiber volume fraction). For example, fiber parameters may be selected to provide a maximum shear loss factor greater than about 0.5 and a real portion of the dynamic shear modulus value G' (e.g., $G_{13}$) greater than about $1 \times 10^4$ psi at the frequency-of-maximum-shear-loss-factor.

In other embodiments, the fiber parameters may be selected such that the composite material possesses a maximum Young's (e.g., $E_{11}$) loss factor greater than about 0.15 and a real portion of the dynamic Young's modulus value E' greater than about $2\times10^5$ psi at the frequency of maximum Young's loss factor.

In one embodiment, the fibers may comprise substantially continuous fibers. Examples of these continuous fibers may include, but are not limited to, fiber fabrics and fiber braids. In alternative embodiments, the fibers may include discontinuous fibers. Examples of discontinuous fibers may include, but are not limited to, fiber mats, carbon, graphite, glass, E-glass, S-glass, nomex, aramid, polymers, thermoplastics, polyethylenes, ultra high molecular weight, polypropylenes, polyesters, poly-p-phenylene-benzobisoxazole (PBO), boron, polyamide, Innegra®, Kevlar®, nylons, ceramics, metals, fiberglass or composites. However, it may be understood that other fibers may be employed without limit. The concentration of the fibers may vary within the range between about 30 vol. % to about 70 vol. % on the basis of the total volume of the composite layer to be formed.

The orientation of the fiber reinforcement may also be varied. For example, the fibers may adopt a ± (plus/minus) orientation with respect to a selected direction (e.g., the principle axis of the composite). For example, the orientation of the fibers may vary within the range between about 0° to about 90°, 10° to about 35°, etc. Examples of fiber orientations may include, but are not limited to, about 0°/90°, quasi-isotropic, ± architectures between about 15° and about 45° or greater (e.g., about ±15°, about ±20°, about ±25°, about ±30°, about ±45°, etc.). For example, varying fiber architecture can create highly orthotropic materials in which the dynamic Young's modulus in one direction (e.g. the $E_{11}$ direction of a ±25° fiber architecture) may be more than 20 times higher than in another direction (e.g. $E_{22}$). In this same embodiment, the loss factor in one direction (e.g. the $E_{22}$ direction of a composite with ±25° fiber architecture) may be more than two times higher than in another direction (e.g. the $E_{11}$ direction). The impact of fiber architecture is shown in FIG. 3.

In certain embodiments, the principle axis of the viscoelastic composite material may be aligned with a key vibration mode of the structure. In certain embodiments, the long axis of a beam may be selected as the principle axis because it aligns with the fundamental bending mode. The fundamental bending mode is the vibration mode with the lowest frequency. Fundamental modes tend to align with the longest unsupported span of a structure, which is a logical alignment feature when selecting a principle axis. Aligning the principle axis of the beam with the principle axis of the composite may provide effective damping and may ensure a symmetric vibration response.

In other embodiments, an alternative principle axis selection may be desirable. In certain embodiments, the short axis of a beam may be selected as a principle axis to align the "soft" direction of the viscoelastic composite with the fundamental vibration mode because the soft direction of the viscoelastic composite may have a higher material loss factor. The tradeoff between modulus and loss factor is complex, and may be evaluated on a case by case basis.

In other embodiments, the vibration modes of a structure may be modeled with finite element software. Many applications have certain critical vibration modes that are targeted for damping, such as rotating-harmonic-frequency-vibration modes. A principle axis may be selected such that the stiff axis (e.g. the principle axis) of the viscoelastic composite is aligned with the principle axis of the structure to maximize system loss factor for the targeted vibration mode(s).

In one embodiment, fiber architecture can be designed to create composite materials with exceptionally high Poisson's ratios (e.g. greater than about 0.5). When a homogeneous material is stretched (tensile strain) in one direction, it tends to contract (compression strain) in the other two directions perpendicular to the direction of tension. Poisson's ratio may be defined as the ratio of the negative compression strain divided by the tensile strain, for small values of these changes. The theoretical maximum Poisson's ratio for a homogeneous material is about 0.5.

In certain embodiments, an exceptionally high Poisson's ratio (e.g. greater than 0.5) may produce exceptionally high damping (e.g., loss factors) for a given stiffness. For example, a certain embodiment (e.g. fiber-reinforced polyurethane viscoelastic composite with a biaxial fiber orientation) with a Poisson's ratio (e.g. $v_{12}$) of 3.0 may demonstrate exceptional damping properties. In response to a given input tensile strain in the 11-direction (e.g., $\epsilon_{11}$=+100 microstrain), this viscoelastic composite response will be three times the input strain in a compressive 22-direction (e.g., $\epsilon_{22}$=−300 microstrain), which produces a highly distorted element that must compensate with expansion in the 33-direction (e.g., $\epsilon33$=approximately +200 microstrain, assuming an incompressible material). These strain components (e.g., $\epsilon_{11}$ and $\epsilon_{22}$ and $\epsilon_{33}$) are components of the total strain energy available to be converted into heat (i.e., damping) by the viscoelastic material. For example, if one assumes a constant strain input of 100 microstrain, a material with a Poisson's ratio of 3.0 may generate a total strain of 600 microstrain by summing $\epsilon_{11}$ and $\epsilon_{22}$ and $\epsilon_{33}$ strain magnitudes (i.e., 100+200+300=600 microstrain assuming constant volume). In contrast, a 100 microstrain input into a material with a Poisson's ratio of 0.5 (i.e., the theoretical maximum for homogeneous materials) may generate 66% less total strain in response to (i.e., 100+50+50=200 microstrain assuming constant volume). Based on these simplified assumptions, a high-Poisson-ratio material may generate about three times more total strain in response to a given input strain. This "strain magnification effect" may result in a composite with exceptional damping performance (e.g. an effective combination of dynamic storage modulus and loss factor).

Figure 5:
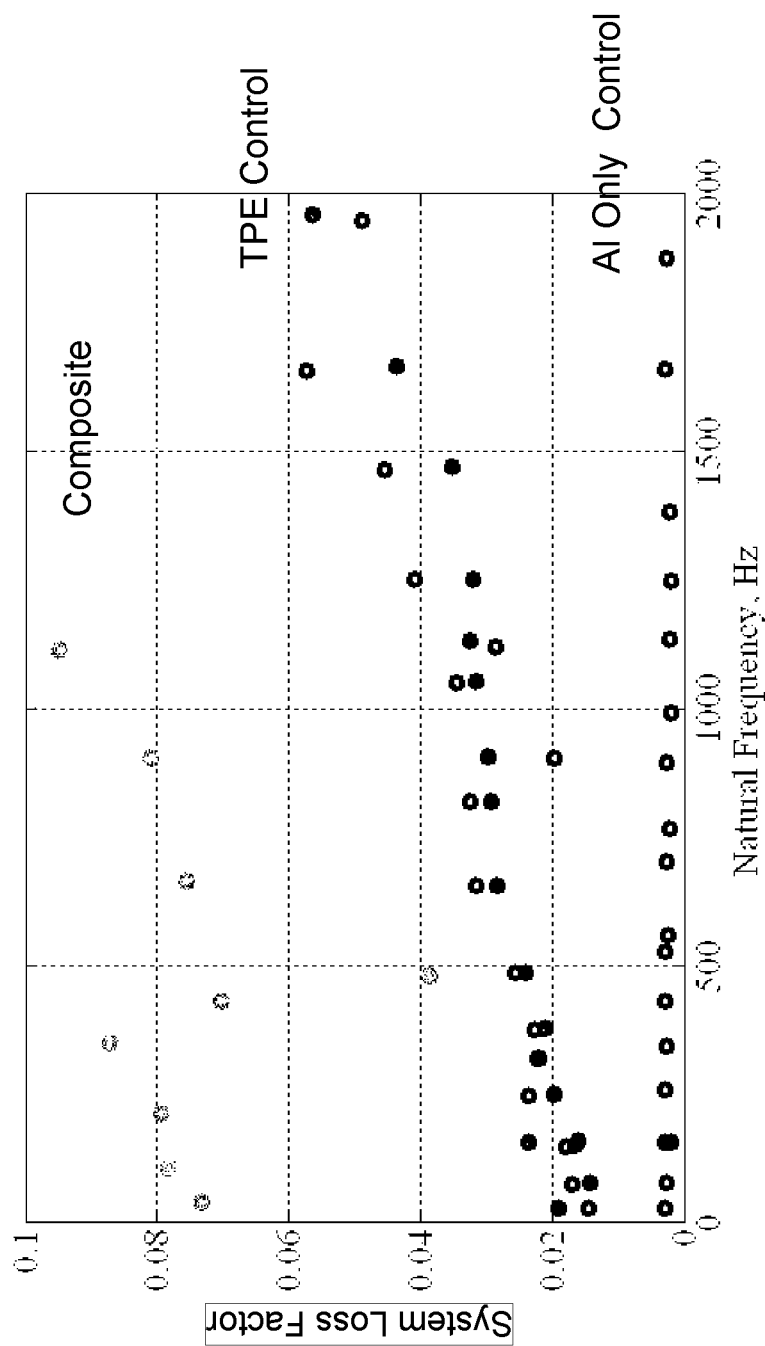
FIG. 5 is a plot of a system loss factor as a function of frequency for embodiments of the polymer composite of FIG. 1 and comparative materials.

In certain embodiments, the present invention may increase system damping loss factor more than 100% (e.g., a treated aluminum beam). FIG. 5 shows the effectiveness of a strain magnification effect within the present invention bonded to an aluminum beam. The present invention is 100% to 300% more effective (e.g. the system loss factor is 2 times to 4 times higher) compared to a state of the art damping tile bonded to an equivalent aluminum beam. It should be noted that these highly simplified assumptions are intended to illustrate the mechanics of an exceptionally high Poisson's ratio, and are not intended to represent a precise or rigorous examination of the physics underlying the damping process. It is understood that the interactions are complex, and that increasing stiffness tends to decrease total strain magnitude.

In another embodiment, certain biaxial orientations (e.g., a fabric layer with fibers aligned in two different directions) may possess Poisson's ratios above 0.5 (e.g., certain embodiments of the present invention with a biaxial fiber orientation range from about ±1° to about ±55° relative to the measurement axis), in which relatively small linear expansion in one direction results in relatively large contraction in another direction. This may be visualized as a "scissor-type motion" of the fibers, which tends to increase shear strain energy loss in response to a given input strain.

Increasing Poisson's ratio may increase the strain magnification effect, which may improve composite damping performance (e.g. an effective combination of dynamic storage modulus and loss factor). The impact of fiber architecture is shown in FIG. 3.

In another embodiment, engineering calculations show Poisson's ratios greater than about 6.0 (i.e., 12 times higher than the theoretical maximum for homogeneous materials) may be practical with biaxial fiber orientations with a biaxial fiber orientation range from about ±8° to about ±25° relative to the measurement axis. Of course, Poisson's ratio is just one of many factors influencing system value, and it is understood that the optimum design may or may not necessarily maximize Poisson's ratio. It is simply noted that certain embodiments with Poisson's ratios above about 0.5 exhibit useful damping properties.

In another embodiment, certain unidirectional orientations may possess Poisson's ratios above about 0.5 (e.g., a certain embodiment of the present invention with a fiber orientation range from about 1° to about 55° relative to the measurement axis in which relatively small linear expansion in one direction results in relatively large contraction in another direction. Increasing Poisson's ratio may increase the strain magnification effect, which may improve composite damping performance.

Figure 4A:
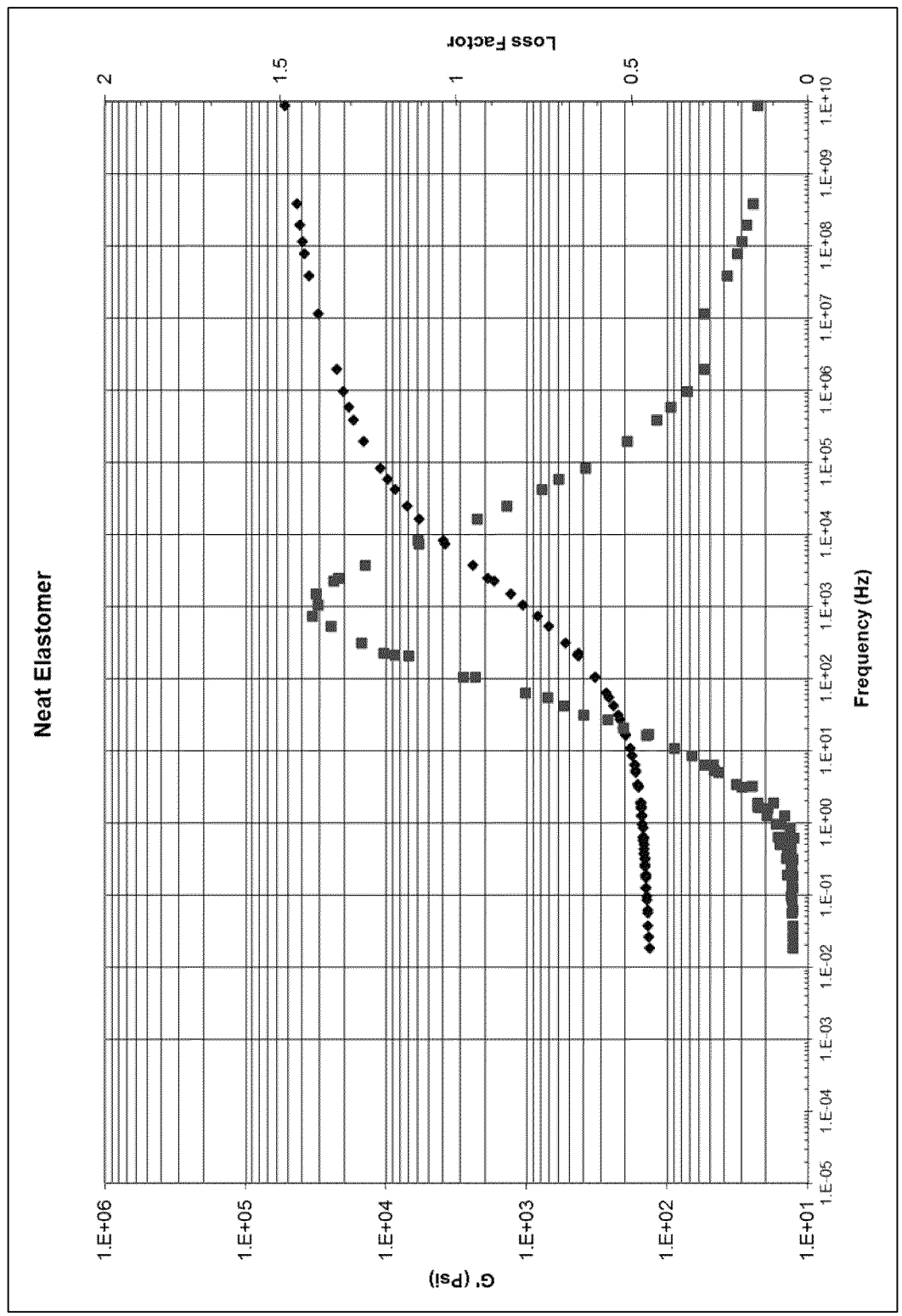
FIG. 4A-4G are plots of shear modulus, G', and loss factor as a function of frequency comparing the performance of embodiments of the polymer composite, neat elastomer, and damping tile.

In certain embodiments, the fiber architecture may create a shear coupling effect, in which a pure shear input may induce normal (i.e., longitudinal) strains. This shear coupling effect enables in-plane fiber architecture (e.g., fibers oriented in the 1-2-plane) to influence out-of-plane shear properties (e.g., $G_{13}$). For example, FIG. 4A shows a polyurethane matrix with the real portion of the dynamic shear modulus measuring about 1000 psi at the frequency of maximum loss factor. Certain embodiments (e.g., the embodiments shown in FIGS. 4C through 4G) demonstrate shear moduli more than 10 times higher than the matrix shear modulus. This shear modulus magnification factor (e.g., increasing matrix shear modulus more than a factor of 10) is much higher than would be expected by a simple rule of mixtures. Factors that may enhance shear coupling and strain magnification effects include the elastomer matrix, fiber composition and fiber architecture (e.g., ply orientation and/or fabric texture). The present invention demonstrates many embodiments that demonstrate exceptional combinations of dynamic moduli and loss factors.

It should be noted that these descriptions of "Poisson's ratio", "tensors" "strain magnification effects" and shear coupling effects may serve as useful design tools, and are not intended to represent a precise or rigorous examination of the physics underlying the damping process. These descriptions in no way limit the scope of the invention.

In certain embodiments, the type and orientation of the fiber reinforcement may be designed to create a negative coefficient of linear expansion in one direction (e.g., along the principle axis of a biaxial carbon fiber reinforced elastomer). This negative coefficient of linear expansion property is unusual because most engineering materials possess a positive coefficient of linear expansion.

In certain embodiments, a large Poisson's ratio (e.g., greater than about 0.5) may be exploited to generate negative expansion in one direction because the natural thermal expansion in one direction creates a Poisson-effect contraction in another direction. If the Poisson's ratio is high enough, the Poisson's effect from matrix expansion in one direction may overcome the natural expansion of the matrix to induce negative expansion in the stiff direction of the composite. This may be visualized as a "scissor-type motion" of the fibers.

In a further embodiment, the fiber selection may induce a more extreme negative coefficient of linear expansion. For example, carbon fibers have a slightly negative coefficient of linear expansion (e.g., negative-1 microstrain per ° F.). The examples show a carbon fiber reinforced polyurethane elastomer with a ±28° fiber orientation had a coefficient of linear expansion in the principle axis measuring about negative-5 microstrain per ° F. over a broad temperature range from 0° F. to 100° F., which is several times more negative than typical carbon fibers.

Figure 2:
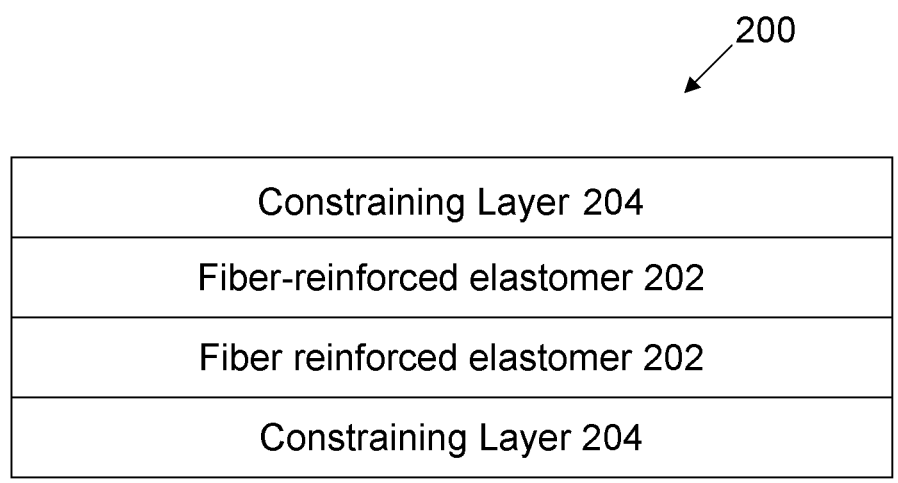
FIG. 2 is a schematic illustration of embodiments of layers of the polymer composites of the present disclosure.

In certain embodiments, the elastomer-infiltrated fiber layers may be cured in block 106 so as to allow handling of the layer. Curing may be performed at a temperature and time which causes the elastomer to adopt at least a selected viscosity that allows the layer so cured to be handled without substantially damaging the layers. A selected number of fiber-reinforced elastomer layers 202 may be assembled without limit to form the composite 200, as illustrated in FIG. 2. For example, the number of layers may be selected in order to provide a composite 200 having a selected thickness and/or weight.

Figure 11:
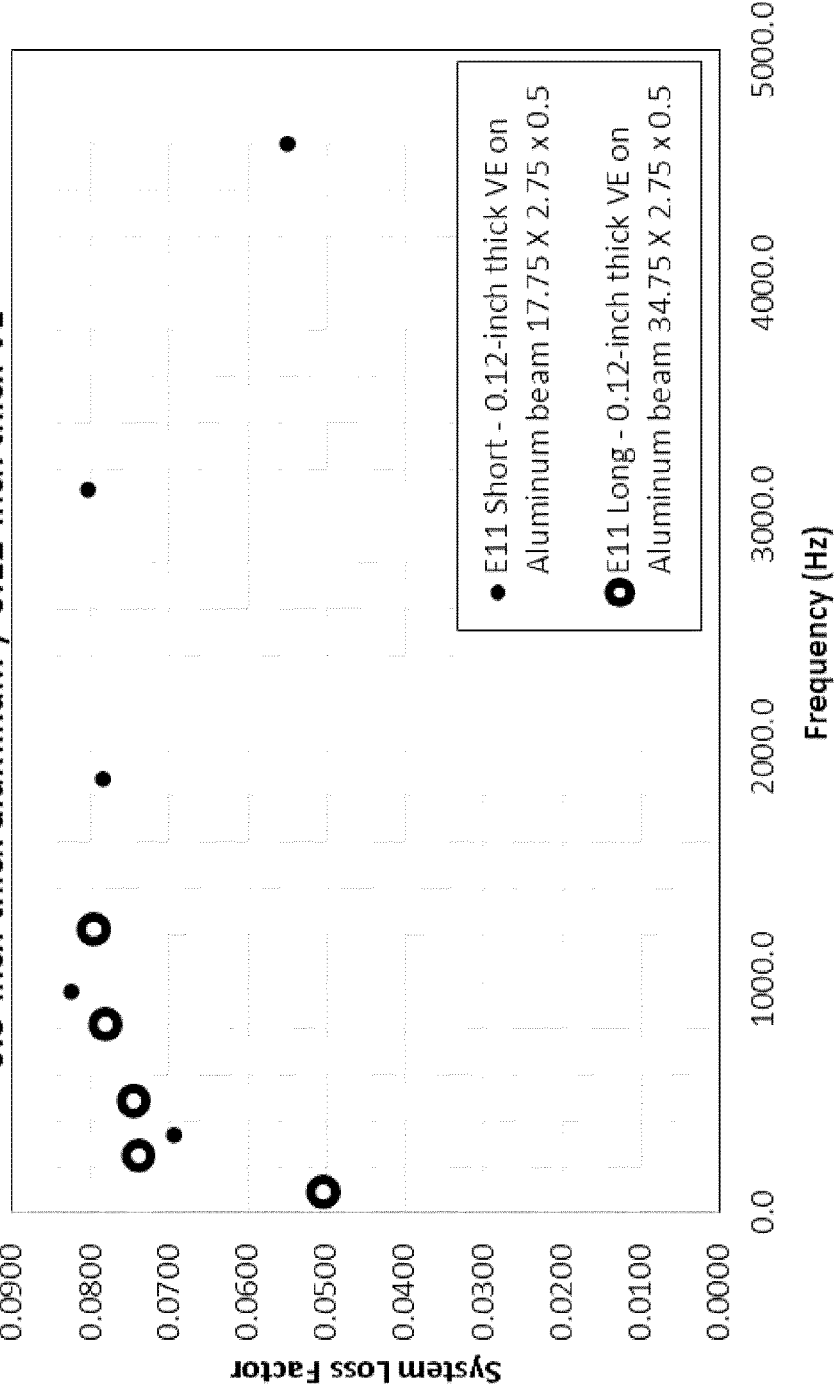
FIG. 11 is a modal system loss factor plot as a function of frequency for two 0.5-inch thick aluminum beams coated with a 0.12-inch thick viscoelastic composite layer on one surface.
Figure 12A:
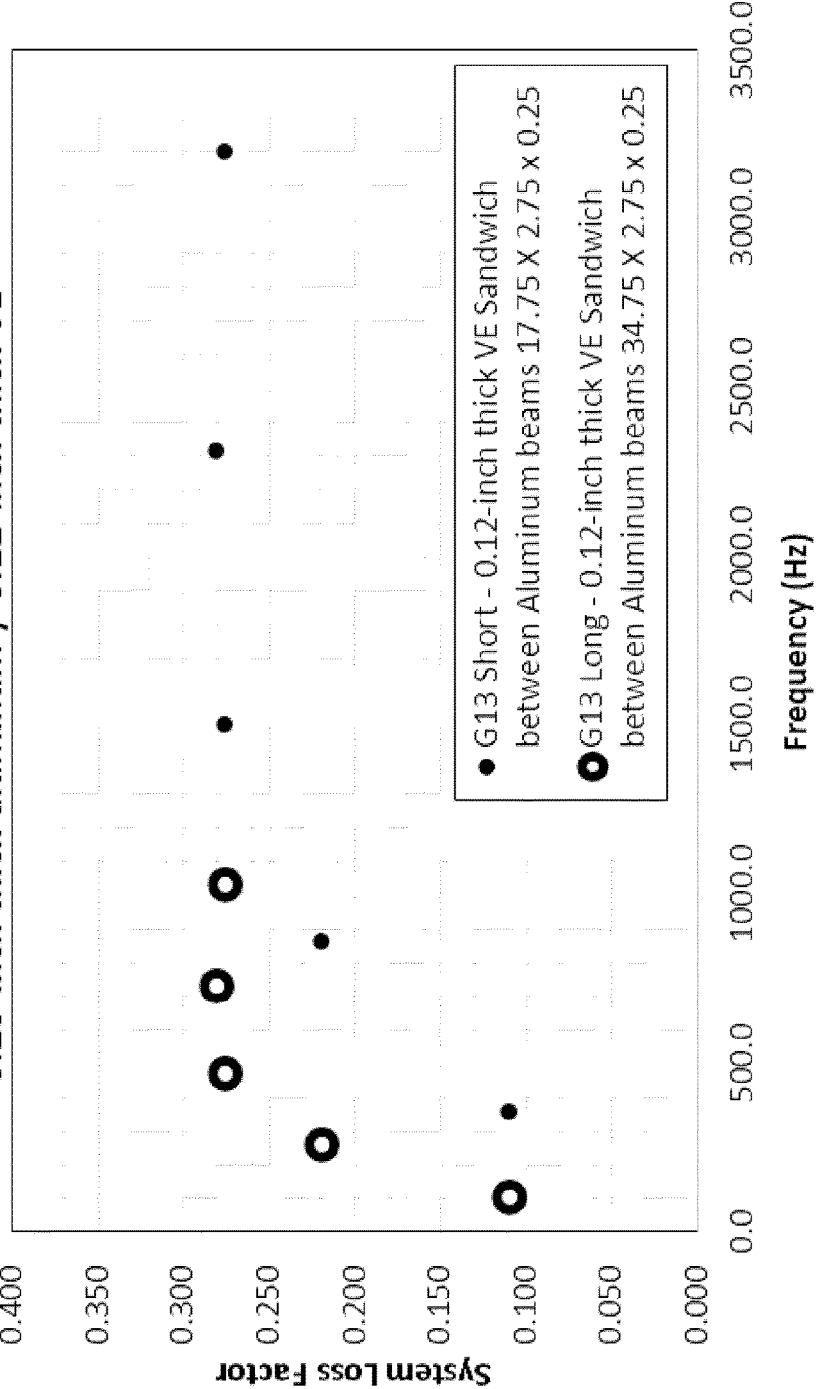
FIGS. 12A-12B show modal system loss factor plots as a function of frequency for 0.25-inch thick aluminum beams sandwiching a 0.12-inch thick viscoelastic composite core layer. The $G_{13}$ plot represents a ±28° viscoelastic composite fiber orientation, and the $G_{23}$ plot represents a ±62° viscoelastic composite fiber orientation relative to the long axis of the aluminum.
Figure 12B:
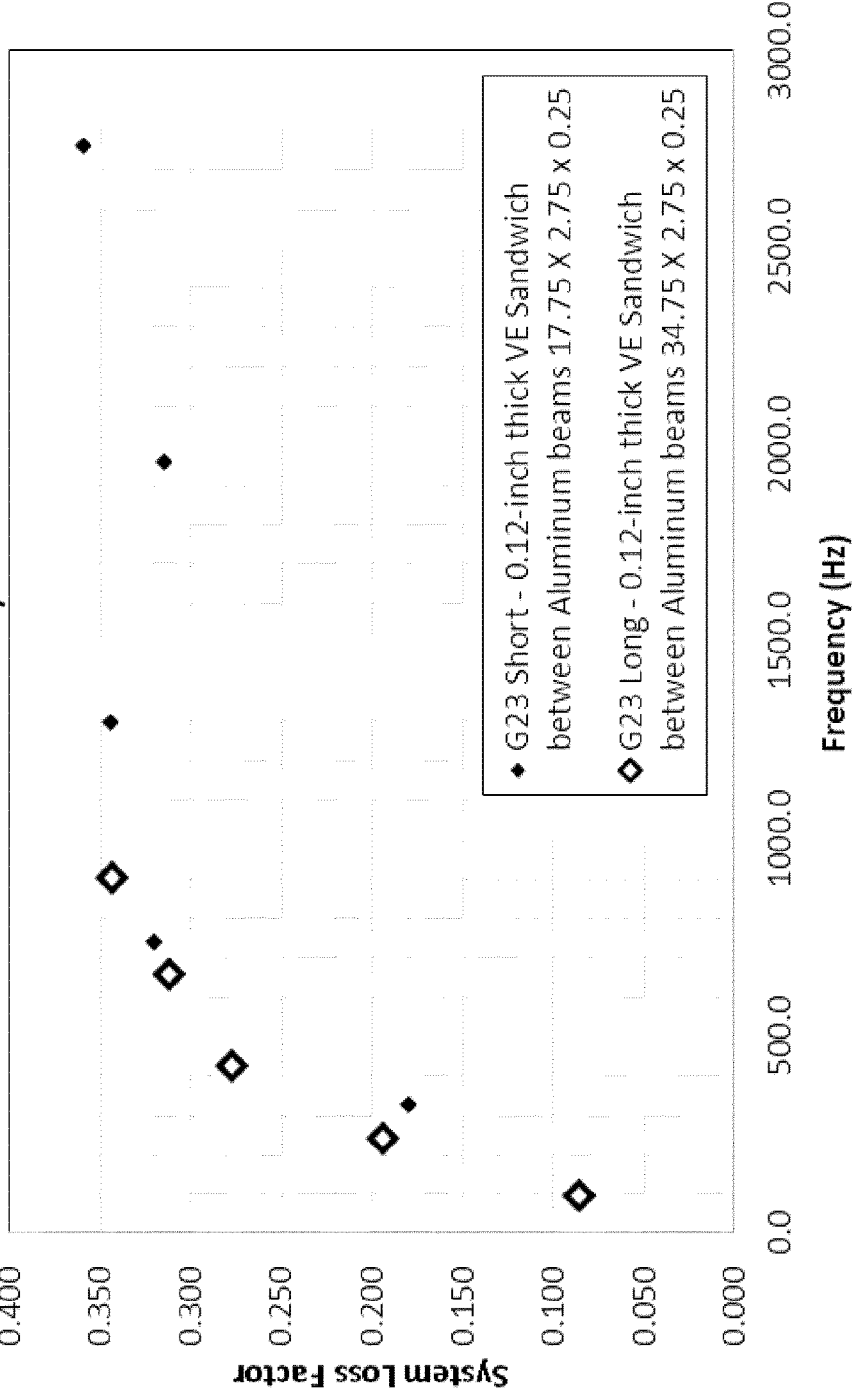

Optionally, the composite 200 may include a constraining layer 204 applied to one or more surfaces of the fiber-reinforced elastomer layers 202 in block 106. The constraining layer 204 may further increase the system loss factor of the composite 200 in a selected direction (e.g., about the longitudinal direction, $E_{11}$). For example, as illustrated in FIG. 2, the constraining layer 204 may be applied to at least a portion of the exterior surface of the polymer composite 200. For example, FIGS. 11 and 12A-12B show how adding an aluminum constraining layer increases the system loss factor.

In certain embodiments, the constraining layer 204 may comprise a metal layer (e.g. foils, sheets, plates, beams, rods, tubes or rebar). One or more of the metal layer parameters of the constraining layer 204 may be varied with respect to the fiber-reinforced elastomer layers 202. Example variable parameters include alloys, thickness, length, width, diameter, shape and form. However, it may be understood that other variable parameters may be employed without limit. Example alloys include alloys of aluminum, steel, stainless steel, nickel, copper, titanium, magnesium and bronze. However, it may be understood that other materials and forms may be employed without limit.

In certain embodiments, the constraining layer material may include alternative materials, such as polymers, ceramics, concrete, rebar, glass, plastics, thermoplastics, thermosets and fiber-reinforced composite materials (e.g., fiberglass/epoxy composites, fiberglass/polyester composites, carbon/polymer composites, and carbon/epoxy composites). In certain embodiments, the structure itself (i.e., the structure to be treated to improve damping) may function as a constraining layer.

In certain embodiments, the constraining layer 204 may comprise a fiber-reinforced polymer layer. One or more of the fiber material, fiber orientation, and relative concentration of the constraining layer 204 may be varied with respect to the fiber-reinforced elastomer layers 202.

In certain embodiments, the polymer matrix of the constraining layer 204 may comprise epoxies, polyesters, vinyl esters, cyanate esters, polyurethanes, and other engineering polymers known in the art.

In further embodiments, the fibers of the constraining layer 204 may include, but are not limited to, substantially continuous fibers, such as fiber fabrics and fiber braids and discontinuous fibers, such as fiber mats. The fibers may be carbon, graphite, glass, E-glass, S-glass, nomex, aramid, polymers, thermoplastics, polyethylenes, ultra high molecular weight polyethylenes (UHMW), polypropylenes, polyesters, poly-p-phenylene-benzobisoxazole (PBO), boron, polyamide, Innegra®, Kevlar®, nylons, ceramics, metals, fiberglass or composites. However, it may be understood that other fibers may be employed without limit. The concentration of the constraining fibers may be selected within the range between about 20 vol. % to about 70 vol. % on the basis of the total volume of the composite layer to be formed.

In further embodiments, the orientation of the fibers in the constraining layers may also be varied. For example, the constraining fibers may adopt a ±orientation with respect to a selected direction (e.g., the principle axis of the composite). For example, the orientation of the constraining fiber may vary within the range between about 0° to about 90°, 10° to about 35°, 10° to about 35°, etc. Examples of fiber orientations may include, but are not limited to, about 0°/90°, quasi-isotropic (e.g., [0/+45/90/−45]s), all 20°, about ±15°, about ±20°, about ±25°, about ±30, about ±45°, etc.

In certain embodiments, the constraining layer 204 may be cured to allow handling (e.g., partially cured). Curing may be performed at a temperature and time which causes the constraining polymer composite to adopt a selected viscosity that allows the constraining layer 204 to be handled without substantially damaging the layer 204. In further embodiments, the fiber reinforced elastomer layers 202 and the constraining layers 204 may be affixed to one another. In one embodiment, the layers 202 and 204 may be assembled in a partially cured state and fully cured together. In another embodiment, one or more partially cured constraining layers 204 may be applied to cured layers of the fiber reinforced elastomer 202 and then fully cured. In additional embodiments, the fiber reinforced elastomer layers 202 and constraining layer 204 may be attached to one another using an adhesive, as is known in the art. In certain embodiments, the adhesive may be a curable adhesive.

In certain embodiments the method of fabricating the viscoelastic composite may include vacuum infusion, resin transfer molding (RTM), vacuum assisted resin transfer molding (VARTM), resin film infusion (RFI), compression molding, pultrusion, extrusion, prepreg layup, adhesive bonding, co-molding and/or autoclave curing. However, it may be understood that other manufacturing methods may be employed without limit.

In certain embodiments, the viscoelastic composite material may be joined to a structure, constraining layers, and/or other viscoelastic composite layers via joining methods such as bonding, mechanical fastening (e.g., riveting or bolting), mechanical locking, press-fitting and/or other methods as is known in the art. However, it may be understood that other joining methods may be employed without limit.

In further embodiments, the viscoelastic composite material may be joined directly onto at least a portion a surface of a structure. For example, in certain embodiments, a viscoelastic composite material may be molded or bonded to an interior surface of a structure (e.g., a hull plate) to damp vibrations. In further embodiments, a viscoelastic composite material may be molded or bonded within a bonded assembly to form an integrated structure (e.g., a rotor blade) to damp vibrations. In further embodiments, a viscoelastic composite material may be molded or bonded within a cavity of a structure (e.g., a rotor blade) to damp vibrations. However, it may be understood that other methods may be employed without limit.

In further embodiment, aforementioned methods (e.g., VARTM and/or autoclave curing) may be applied in situ to mold the viscoelastic composite directly into the structure itself. However, it may be understood that other bonding or manufacturing methods may be employed without limit.

In certain embodiments, the viscoelastic composite may be incorporated as an integral part of a structure that damps vibrations in rotating component applications such as rotors (e.g., helicopter rotors), rotor blades (e.g., marine rotor blades), impellers (e.g., pump impellers), drive shafts, fans, motors, engines, propulsion systems, mechanical linkages, torque transmission interfaces, flexible couplings and rotor heads. In further embodiments, the viscoelastic composite may be applied to at least a portion of the surfaces (e.g., between the leading edge and the rotor structure) of leading edges and/or trailing edges of rotor blades to damp vibrations within these edges and within the rotor itself. However, it may be understood that other applications may be treated without limit. It is readily understood that damping vibrations at the source (e.g., the rotating component) may reduce vibrations and noise throughout the surrounding structure.

In certain embodiments, the viscoelastic composite may be incorporated into a structure to create an integrally damped structure for vibrating structure applications such as nacelles, aerostructures, hulls, fairings (e.g. marine fairings), panels (e.g. rotorcraft panels), housings (e.g., fan housings), foundations (e.g. motor foundations), rotorcraft structures, aircraft structures, aircraft panels, vehicle suspensions (e.g. integrated leaf springs), mechanical linkages, struts, control surfaces, tail cones, empennages, stabilizers, acoustic structures, shaving products, landscaping equipment, tools, and/or computer housings. However, it may be understood that other applications may be treated without limit.

In certain embodiments, the viscoelastic composite may be incorporated within a leaf spring structure to make a lightweight integrally damped low-profile suspension system. In certain applications (e.g., race cars), the integrally damped composite may eliminate the need for relatively heavy shock absorbers.

In certain embodiments, the flexibility of the fiber-reinforced elastomer composite may be useful as a compliant structure in applications such as deformable structures, flexible couplings, rotor heads, mechanical joints, mechanical linkages, flexible linkages, alignment-compensation joints, torque transmission interfaces, rotor blade attachments, rotor attachments, drive shafts, shaft linkages, and axle joints. However, it may be understood that the present invention may be incorporated into compliant structures without limit.

In certain embodiments, the negative coefficient of linear thermal expansion of the fiber-reinforced elastomer composite may be used to reduce deformation of a system in response to thermal stimulus. In further embodiments, this composite material may be bonded to surface to negate the thermal expansion of certain structures. In further embodiments, this composite material may be applied in a symmetric configuration (e.g. a sandwich structure) to create a thermally stable structure. However, it may be understood that the present invention may be incorporated into thermally stable structures without limit.

In certain embodiments, the negative coefficient of linear thermal expansion of the fiber-reinforced elastomer composite may be used to increase deformation of a system in response to thermal stimulus. In further embodiments, this composite material may be bonded to a surface to of certain structures to impart motion (e.g., actuation) in response to thermal stimulus. In further embodiments, this composite material may be applied in a non-symmetric configuration (e.g. onto one side of an aluminum beam) to impart a bending moment to improve actuation effectiveness. However, it may be understood that the present invention may be incorporated into thermally-actuated structures without limit.

In certain embodiments, the present invention may be applied within a wide variety of applications, such as vehicles, land vehicles, aircraft, rotorcraft, marine vessels, rockets, space vehicles, offshore platforms, civil engineering structures, buildings, bridges, towers, power plants, engines, motors, pumps, computers, fans, propulsion, HVAC systems, tools, jackhammers, landscaping equipment, shaving equipment, measurement equipment, test equipment and consumer products. However, it may be understood that the present invention may be incorporated into other applications without limit.

EXAMPLES

The vibration damping performance (e.g., loss factor) of embodiments of the fiber-reinforced polymer composites discussed above will now be illustrated. The damping behavior of the composites was evaluated using modal testing and dynamic mechanical analysis to evaluate dynamic modulus and loss factor as a function of frequency. In the tests, beams of the fiber-reinforced elastomer composites, both alone and attached to vibrating structures were examined. Embodiments of the fiber-reinforced elastomer composites were further examined with and without constraining layers. The performance of the composites was compared with control beams in order to illustrate damping improvements provided by the composites. Finite element simulations were further performed to examine the loss factor of systems damped by the composite as a function of modulus.

As discussed in detail below, embodiments of the fiber-reinforced elastomers were found to exhibit a dynamic shear modulus that was between about 3.5 to about 45 times greater than a comparable state-of-art damping tile, as a function of the frequency of vibration. Furthermore, the loss factor of the carbon fiber-reinforced polymer was found to only decrease by about 35 to 50% as compared to the damping tile over the same frequency range. As a result of this favorable trade-off between modulus and loss factor, attaching an embodiment of the composite to a vibrating beam provides a system loss factor that is approximately three to four times that of a comparable vibrating beam with the control damping tile materials. It may be understood that these examples are discussed for illustrative purposes and should not be construed to limit the scope of the disclosed embodiments.

Example 1

Effects of Fiber Reinforcement on Composite Damping Performance

The influence of the fiber configuration of the damping performance of the fiber-reinforced elastomer composites was investigated. FIG. 3 illustrates a plot of storage modulus and loss factor as a function of frequency for embodiments of the fiber-reinforced elastomer composites having carbon-fiber mats, 0°/90° Innegra fibers, ±65° carbon-fiber plain weave, ±45° carbon-fiber plain weave, and ±28° carbon-fiber braid (with respect to the long axis of the composite), where the elastomer was polyurethane. A control elastomer, without reinforcement, was also tested for comparison.

The samples each possessed dimensions of about 3 mm thickness, about 10 mm width, and about 10 mm length. The fibers of the composites were oriented with respect to the long axis of the composite. The fiber volume fraction was about 50%.

As illustrated in FIG. 3, each of the composites exhibited a maximum loss factor greater than about 0.5. Furthermore, each of the composites exhibited a loss factor less than that of the elastomer and a storage modulus greater than that of the elastomer. This result indicates that the presence of the fibers within the composite increases the composite stiffness but decreases the loss factor.

These results indicate that improvements in the storage modulus of the elastomer may be achieved by incorporating reinforcing fibers into the elastomer. Notably, though, the improvement in stiffness results in a drop in the peak loss factor of the composite. Therefore, the choice of reinforcement may be determined by the lowest stiffness that is acceptable in order to provide the highest loss factor for that stiffness.

Example 2

Dynamic Mechanical Analysis (DMA) of Composite and Damping Tile

Figure 4B:
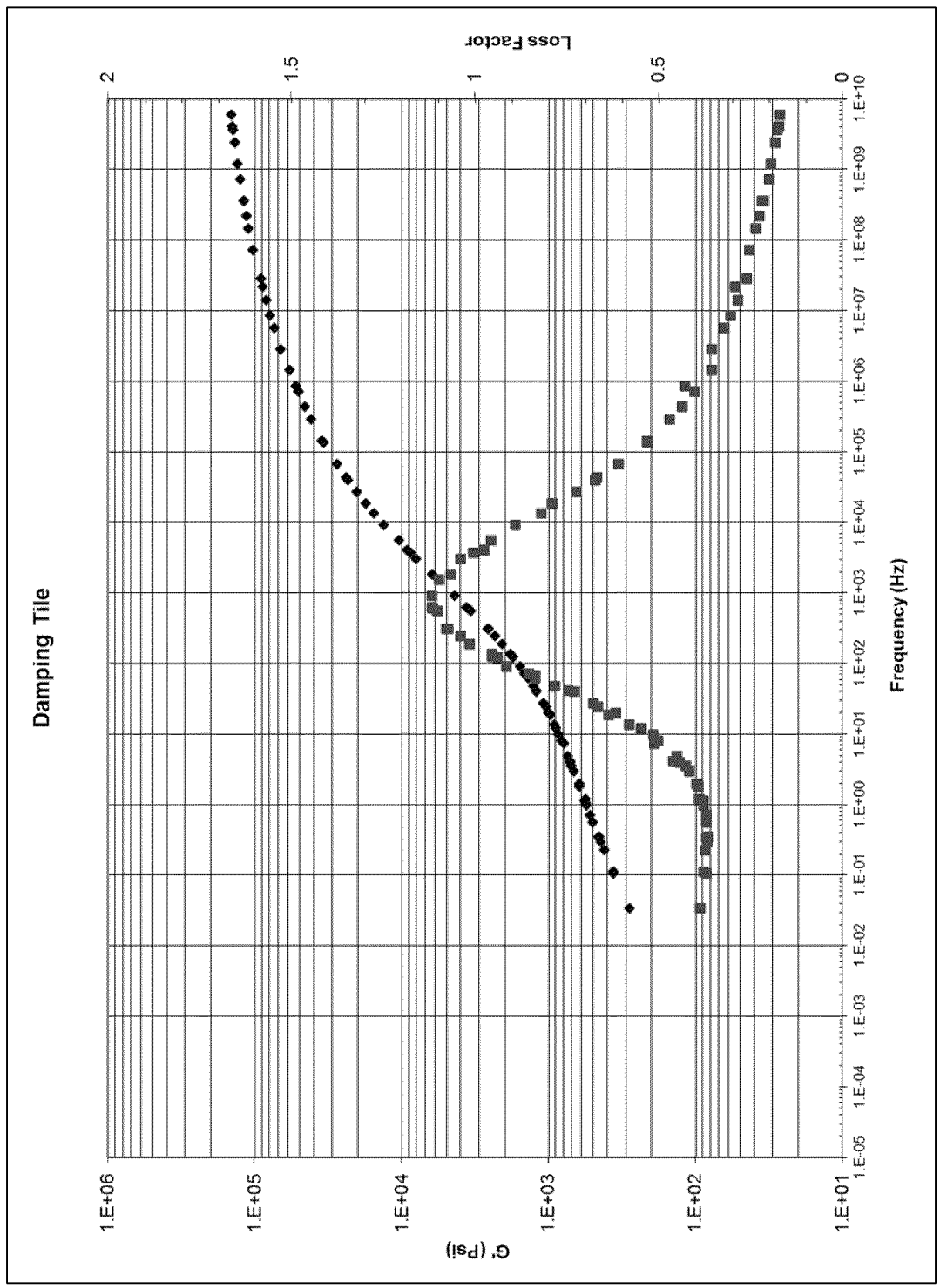
Figure 4C:
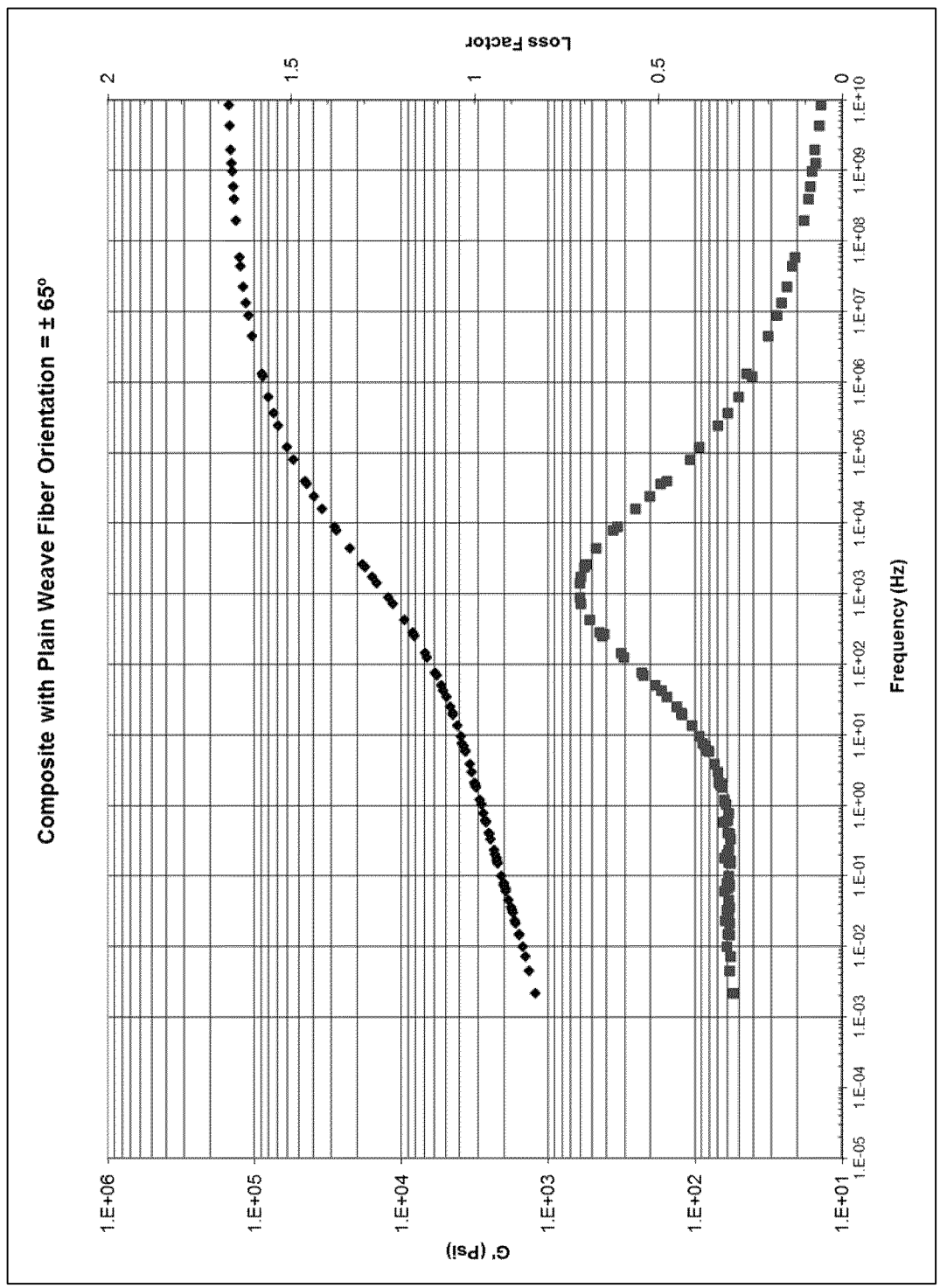
Figure 4D:
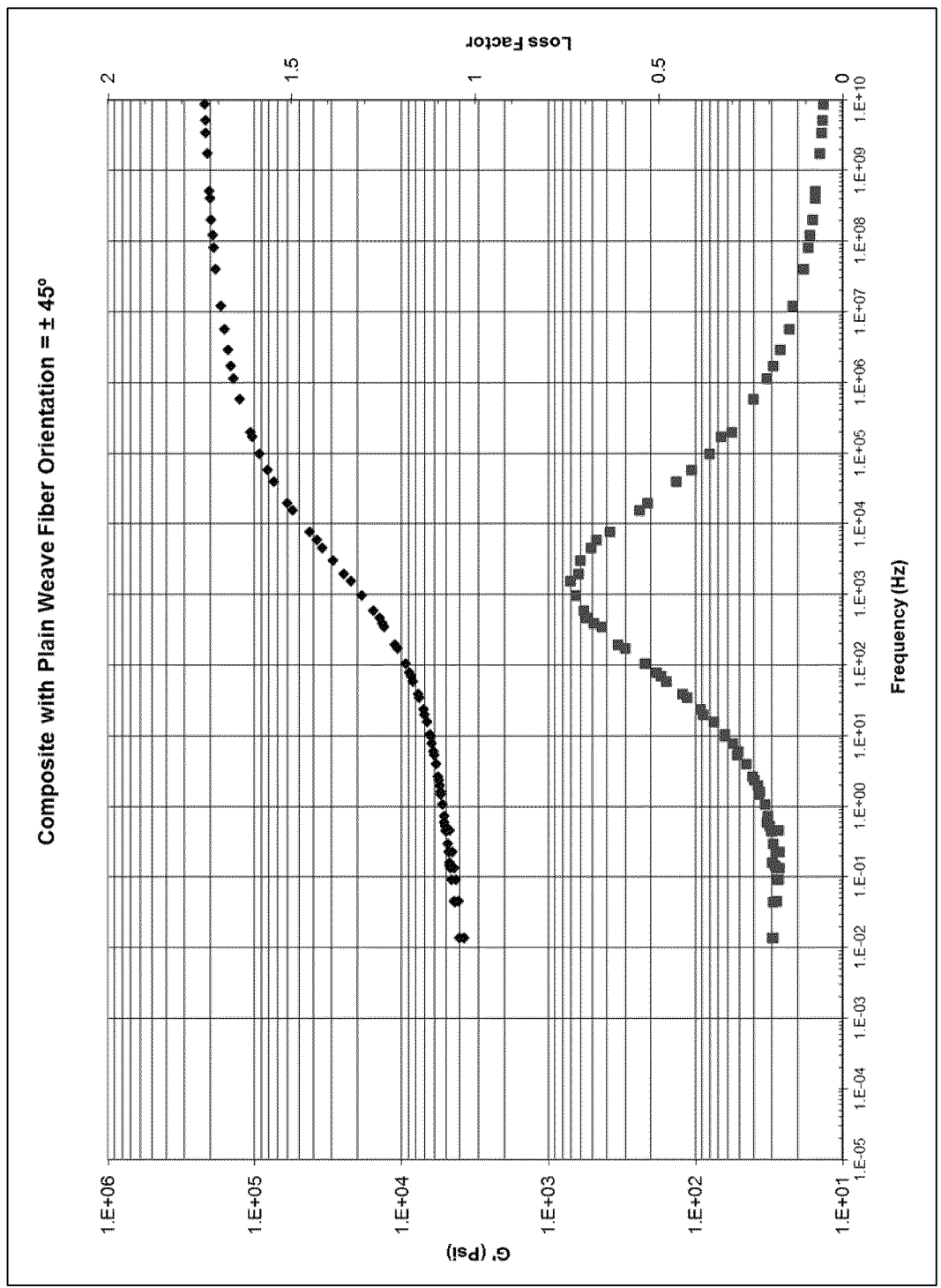
Figure 4E:
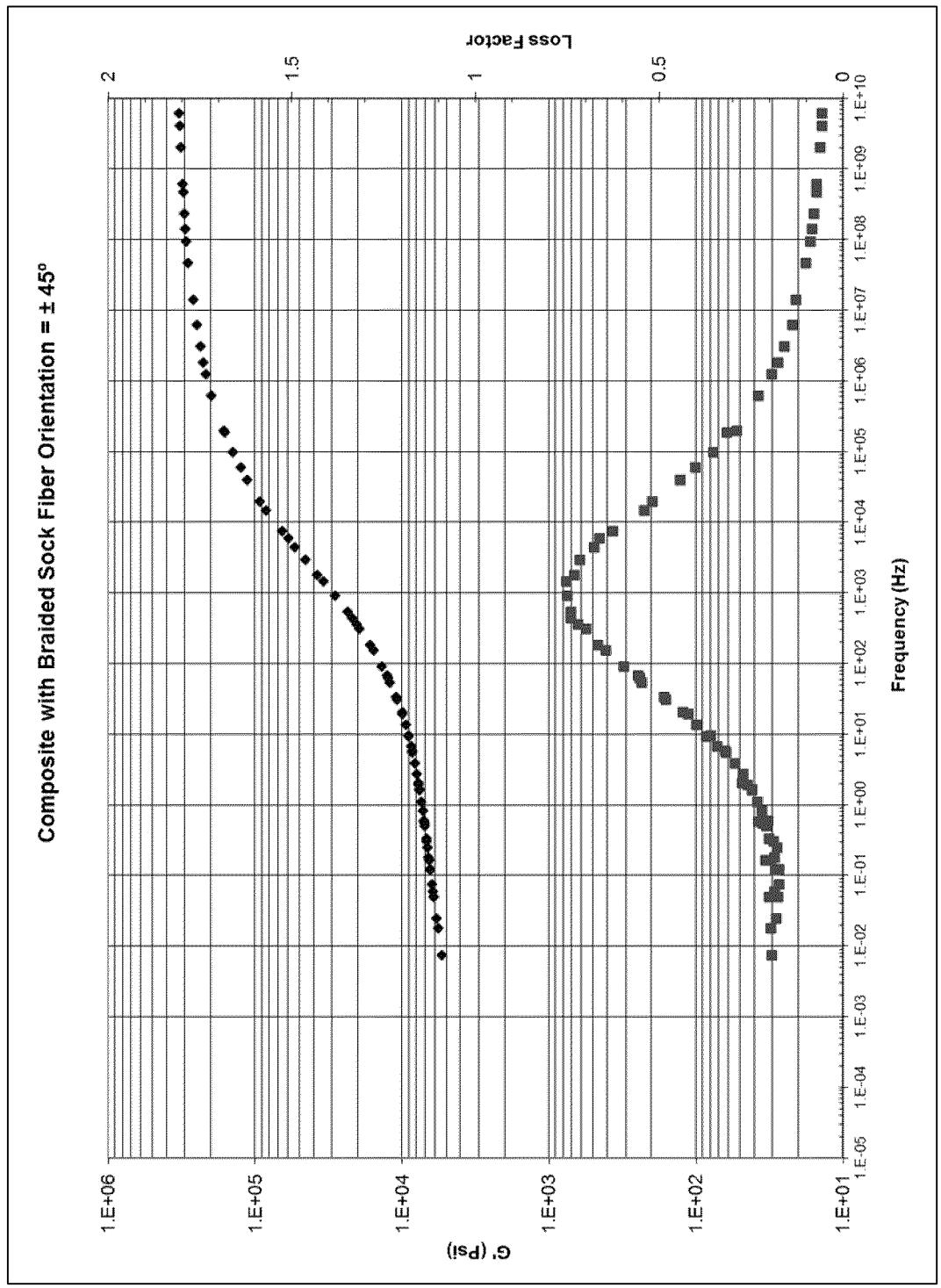
Figure 4F:
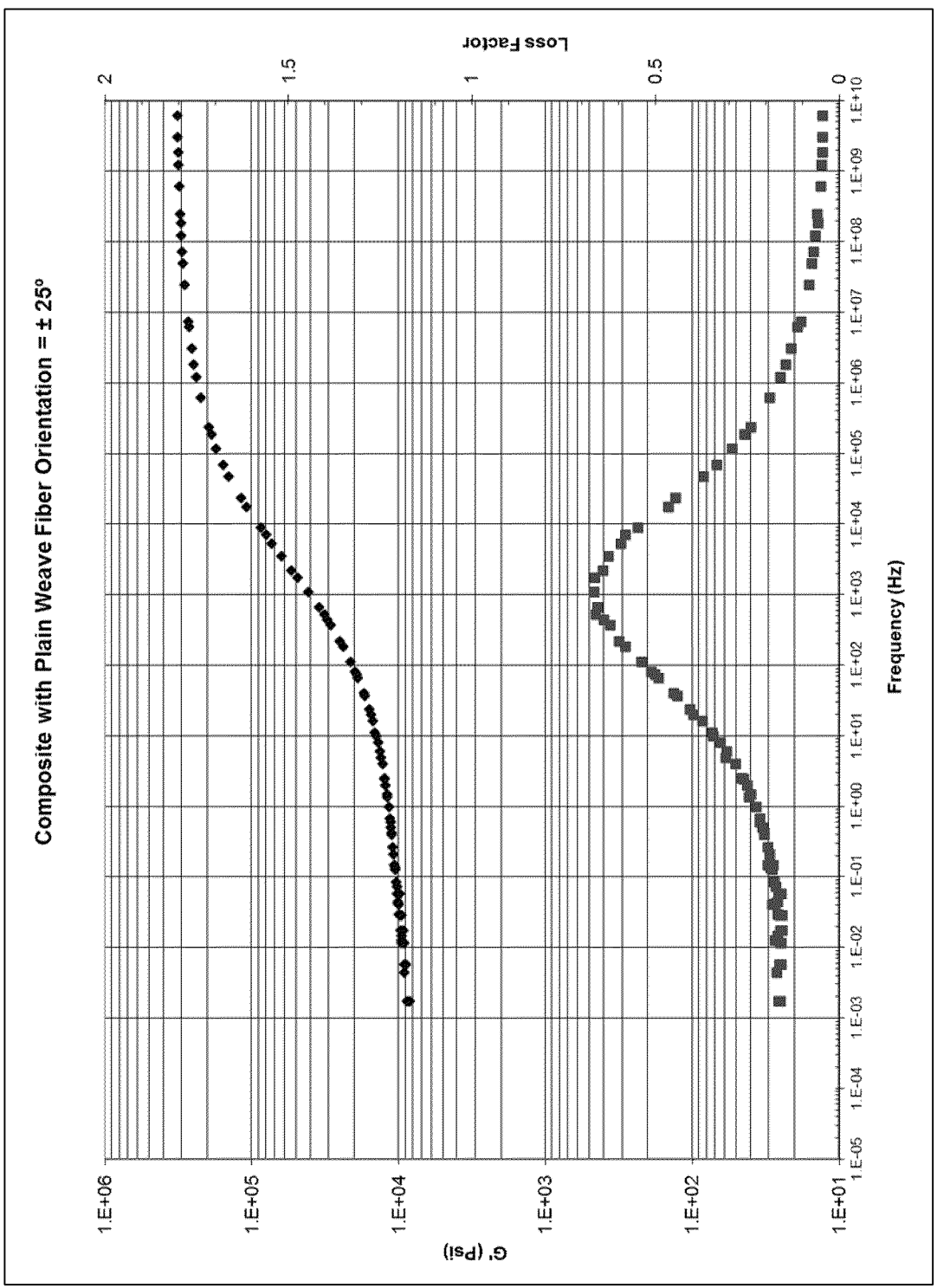
Figure 4G:
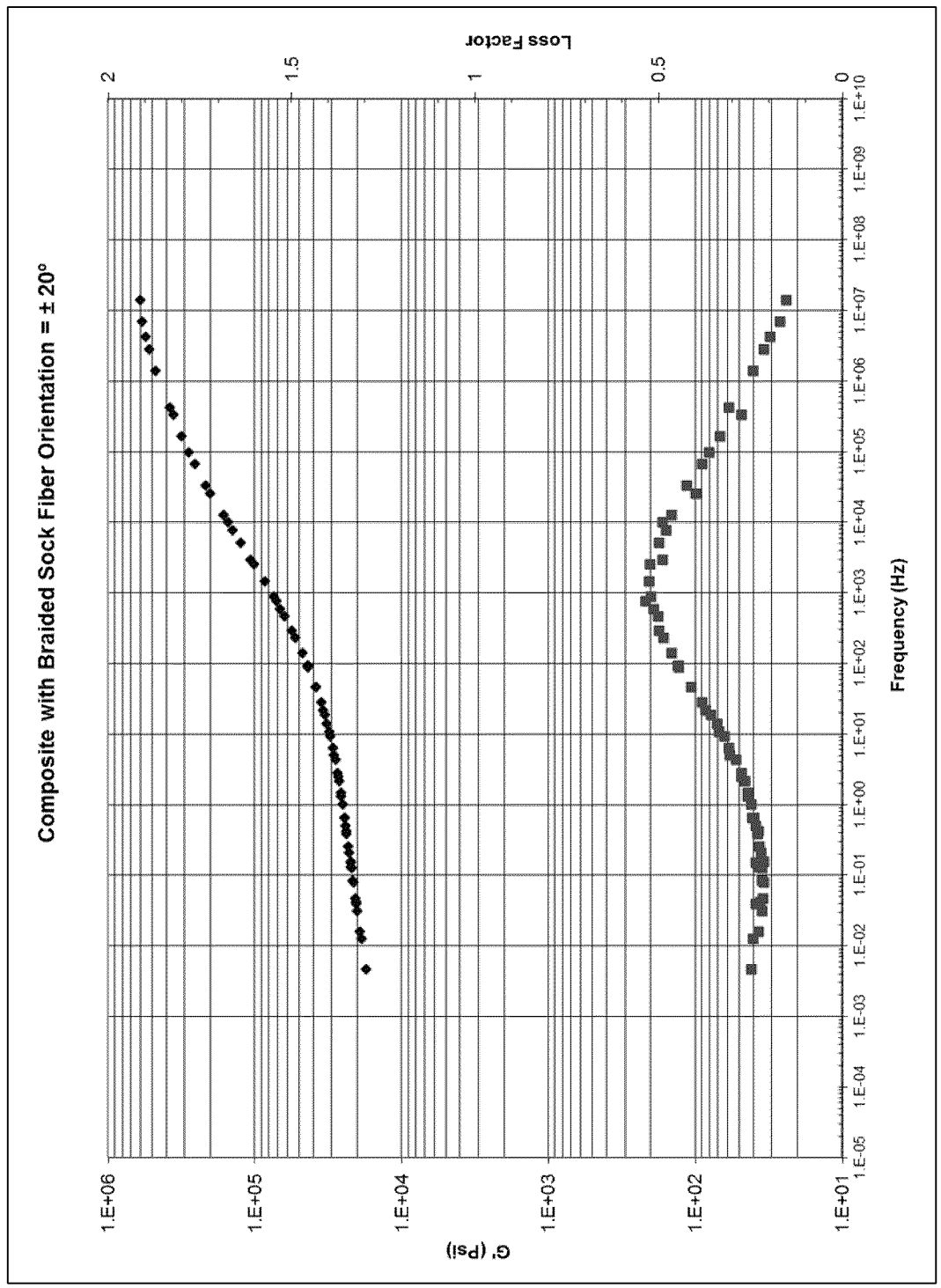

Samples having dimensions of about 3.0 mm thickness, 10.0 mm width, and 9.5 mm length were examined using a Dynamic Mechanical Analyzer (DMA). A neat polyurethane elastomer (FIG. 4A) with no reinforcements was examined. A state-of-the-art damping tile (FIG. 4B) was examined. A composite with carbon fiber having a plain-weave configuration and a fiber orientation about ±65° in a volume fraction of about 50% (FIG. 4C) was examined. A composite with carbon fiber having a plain-weave configuration and a fiber orientation about ±45° in a volume fraction of about 50% (FIG. 4D) was examined. A composite with carbon fiber having a braid configuration and a fiber orientation about ±45° in a volume fraction of about 50% (FIG. 4E) was examined. A composite with carbon fiber having a plain-weave configuration and a fiber orientation about ±25° in a volume fraction of about 50% (FIG. 4F) was examined. A composite with carbon fiber having a braid configuration and a fiber orientation about ±20° in a volume fraction of about 50% (FIG. 4G) was examined.

Samples were tested in a DMA using a single cantilever clamp. A sinusoidal strain was applied at 0.2 and the resulting real and imaginary impedance was measured. The stiffness was converted to a modulus using a K-value calculated from the energy theory. The measurements were converted to G' using a Poisson's ratio calculated from micromechanics engineering simulations. The G' and loss factor values were shifted using time-temperature superposition to evaluate the measurement against frequency. For example, the maximum loss factor is clearly identifiable in FIGS. 4A through 4G, in which G' and loss factor are plotted versus frequency at a given reference temperature. In this case, the maximum shear loss factor aligns with a "center frequency". An alternative DMA plot may plot G' and loss factor versus temperature at a given reference frequency, and the maximum shear loss factor will align with the "glass transition temperature". In each case, G' at the maximum loss factor is quantifiable.

The real portion of the dynamic shear modulus (G') as a function of frequency for each of the tested beams is illustrated in FIGS. 4A-4G. It may be observed that, over the frequency range tested, each of the test samples exhibited a center frequency value at which both the dynamic shear modulus and the loss factor significantly increased. In the case of the dynamic shear modulus, the modulus continued to increase as the frequency increased beyond the center frequency. In contrast, the loss factor decreased with increasing frequency beyond the center frequency.

The dynamic shear modulus was observed to be significantly larger in the composite than in the damping tile. For example, at about 1 Hz, the G' for the softest composite (carbon fiber having a plain-weave configuration and a fiber orientation about ±65°), was about 5 times greater than the damping tile (e.g., about $2.91 \times 10^3$ psi as compared to about $5.65 \times 10^2$ psi). At the maximum loss factor, the G' for the softest composite was about 3.5 times greater than the damping tile (e.g., about $1.22 \times 10^4$ psi as compared to about $3.56 \times 10^3$ psi). In contrast, the maximum loss factor of the softest composite was about 35% lower than the damping tile (e.g., about 0.72 as compared to about 1.1). In another example, at about 1 Hz, the G' for the stiffest composite (carbon fiber having a braid configuration and a fiber orientation about ±20°) was about 45.5 times greater than the damping tile (e.g., about $2.57 \times 10^4$ psi as compared to about $5.65 \times 10^2$ psi). At the maximum loss factor, the G' for the stiffest composite was about 19.8 times greater than the damping tile (e.g., about $7.07 \times 10^4$ psi as compared to about $3.56 \times 10^3$ psi). In contrast, the maximum loss factor of the stiffest composite was about 52% lower than the damping tile (e.g., about 0.53 as compared to about 1.1).

Example 3

Modal Testing and Finite Element Analysis Validation of Dynamic Mechanical Analyzer Evaluation Modal testing of the composite attached to aluminum beams was evaluated at frequencies from about 100 Hz to about 3000 Hz. One composite included 11 plies (about 0.1" total thickness) of carbon fiber laminates, each having fibers oriented at about ±25° relative to the long axis of the composite. The viscoelastic composite was bonded between two aluminum beams having dimensions of about 17.75"×2.75"×0.25" to provide shear deformation. To extend the measurement range, a second sandwich beam was constructed wherein the viscoelastic composite was bonded between two aluminum beams having dimensions about 3.75"×2.75"×0.25". The temperature was maintained at about 23°.

Figure 7A:
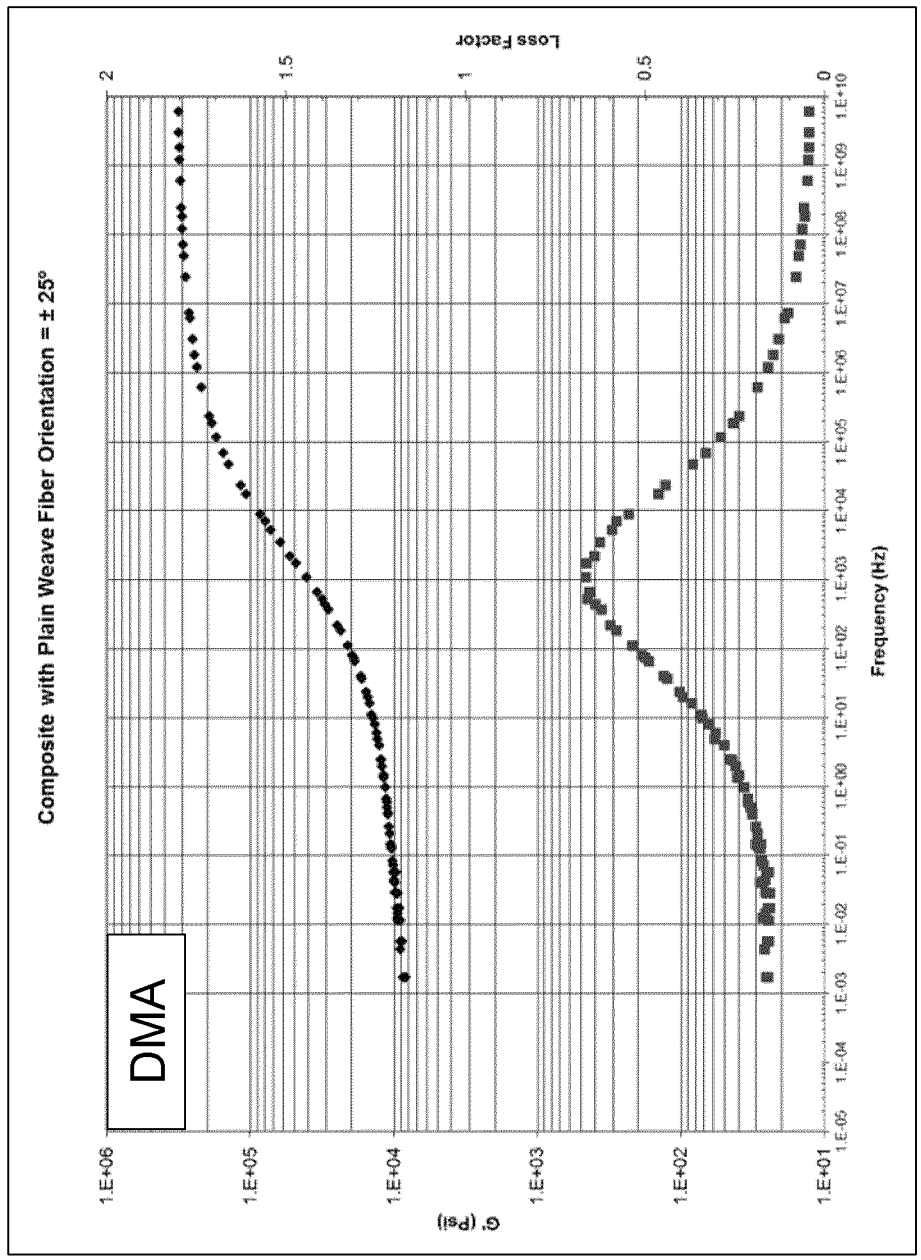
FIGS. 7A-7C are plots of G' and loss factor as a function of frequency comparing the measurements from the DMA to modal testing and finite element analysis (FEA) for $G_{13}$.
Figure 7B:
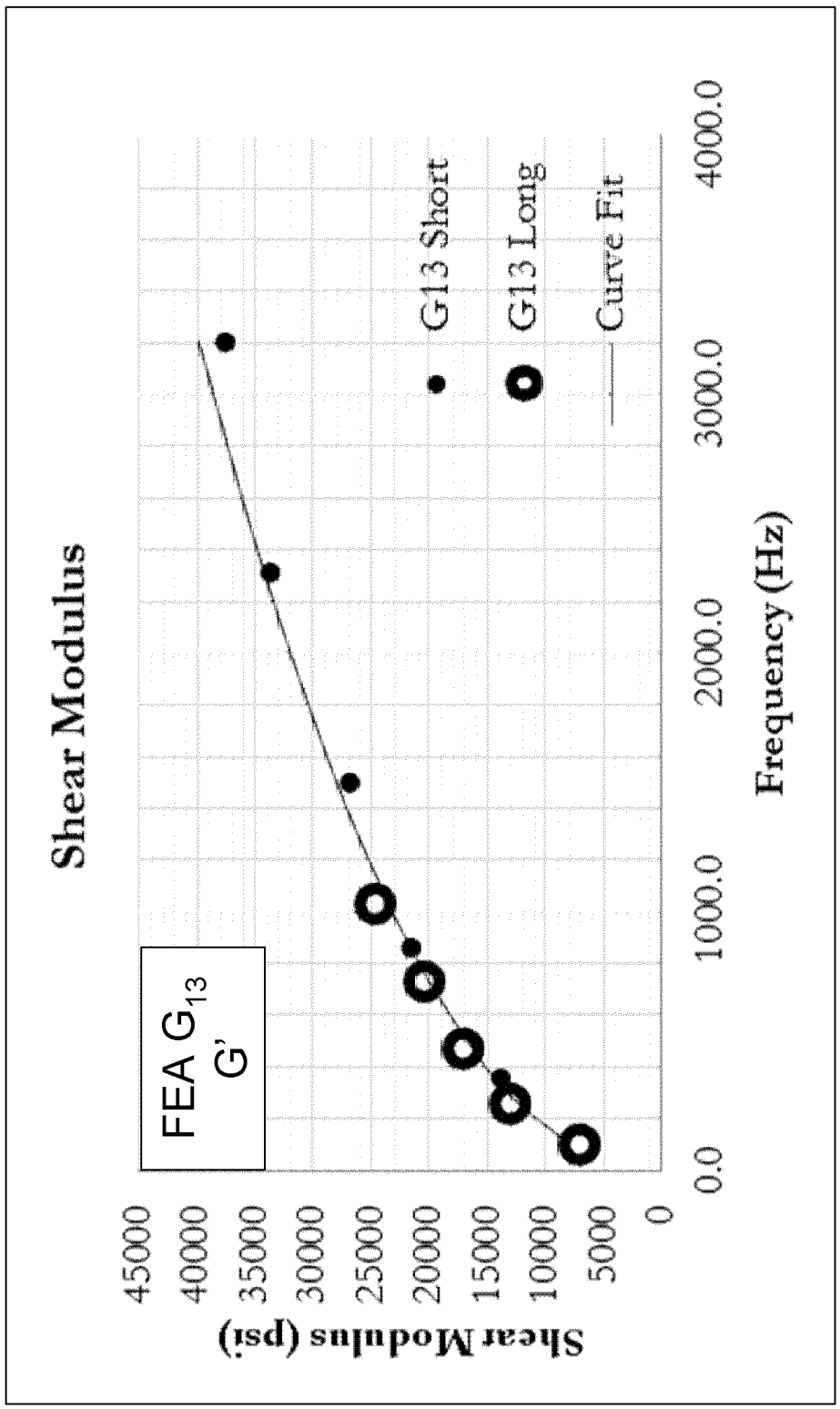
Figure 7C:
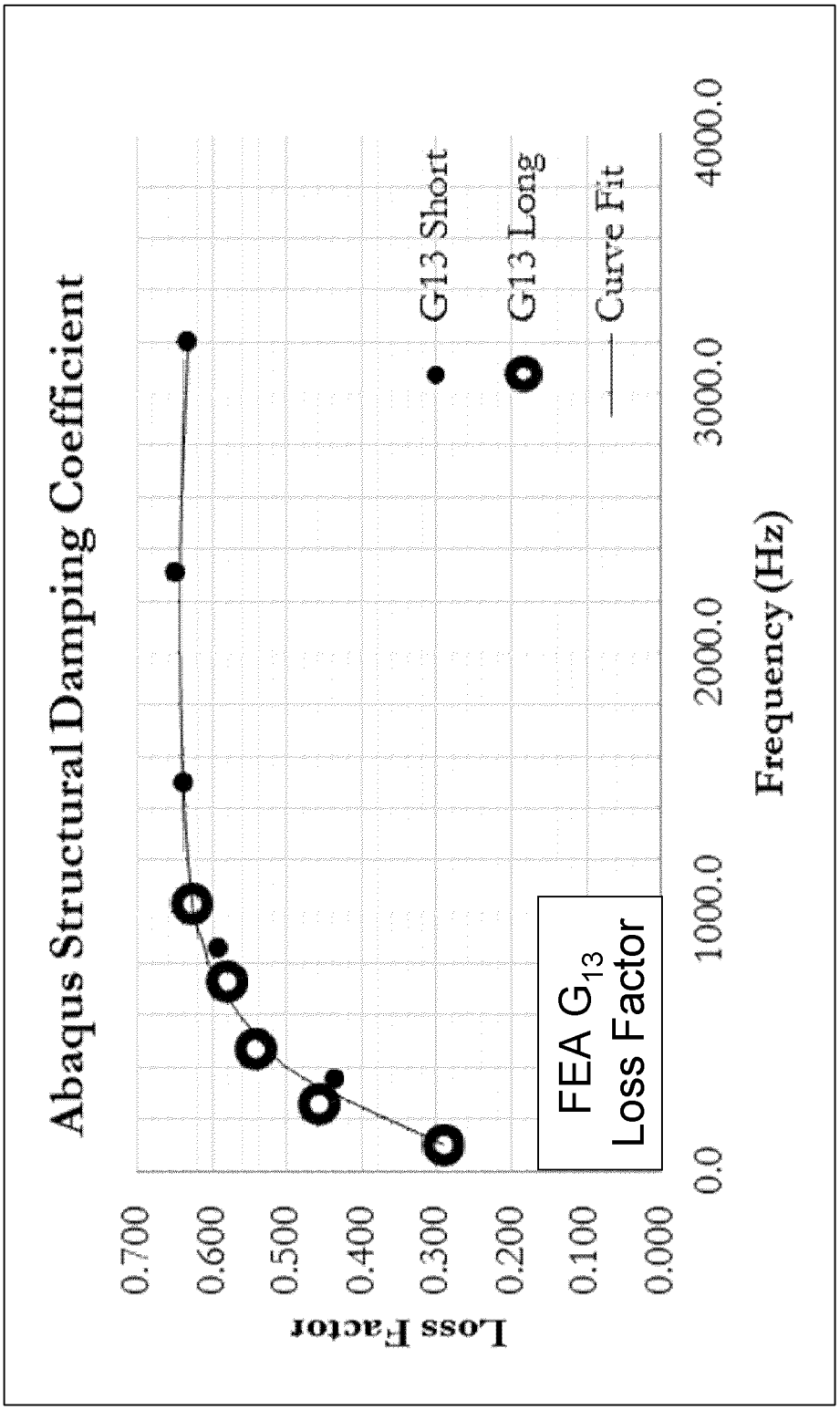
Figure 8A:
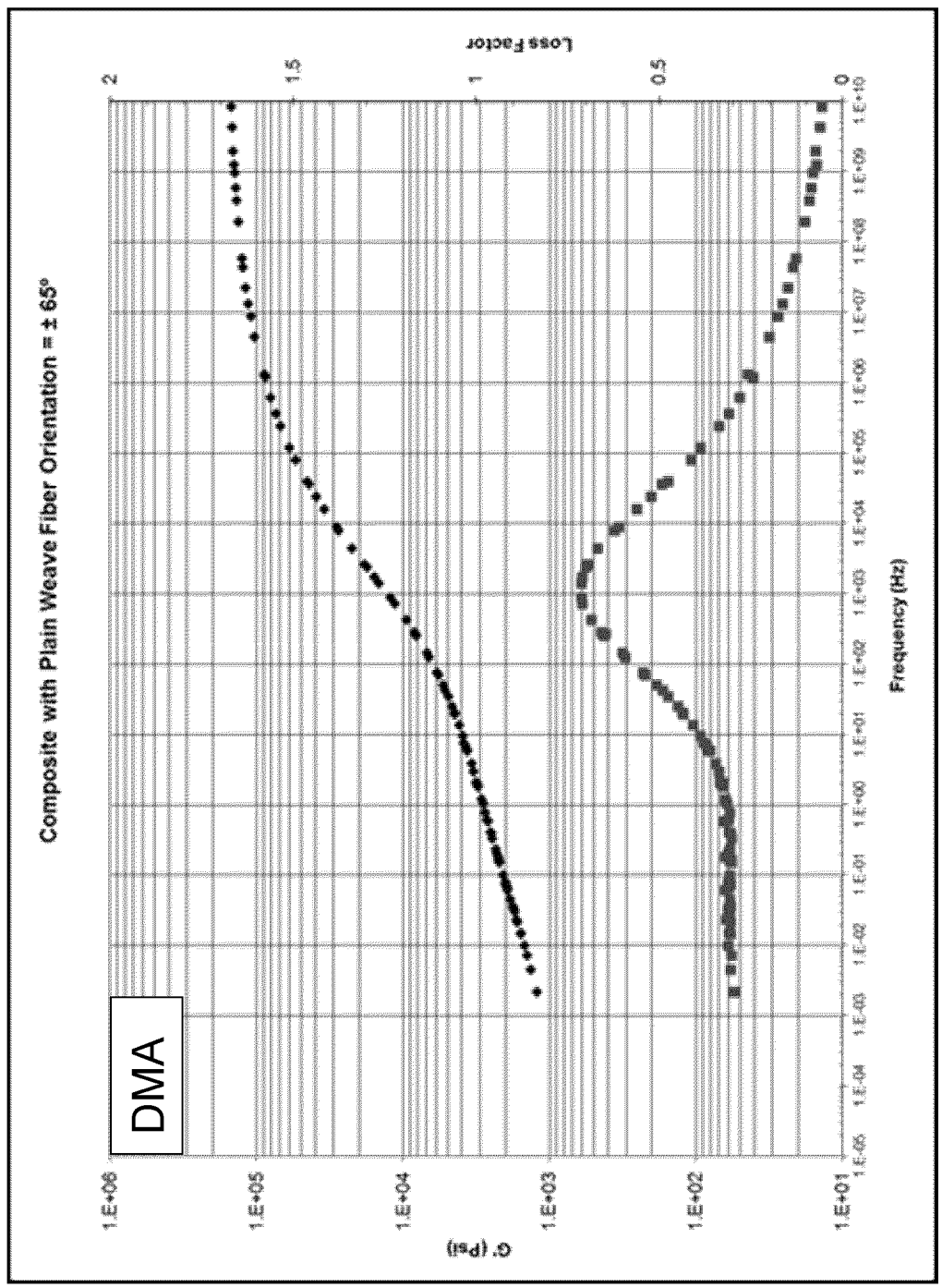
FIGS. 8A-8C are plots of G' and loss factor as a function of frequency comparing the measurements from the DMA to modal testing and finite element analysis (FEA) for G23.
Figure 8B:
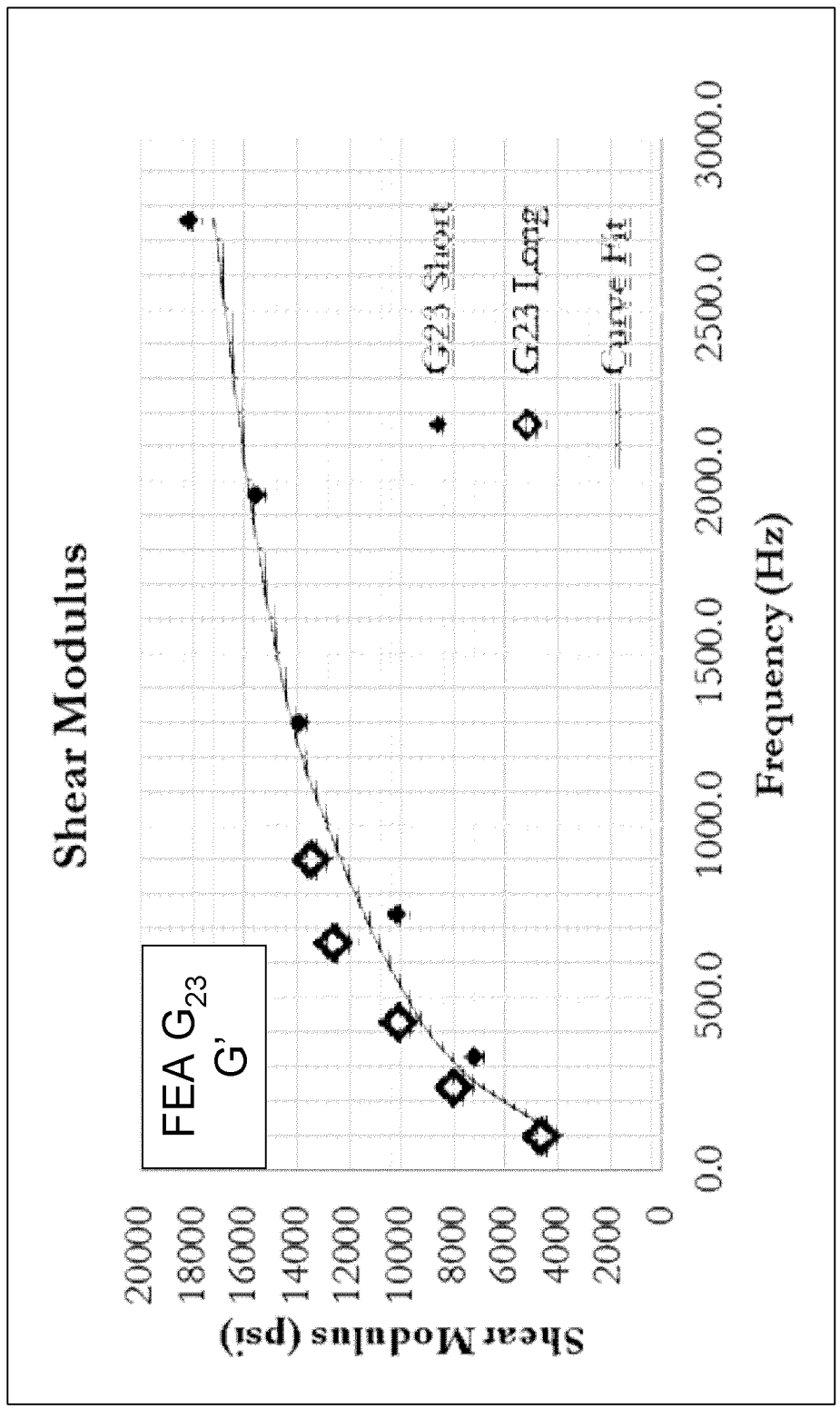
Figure 8C:
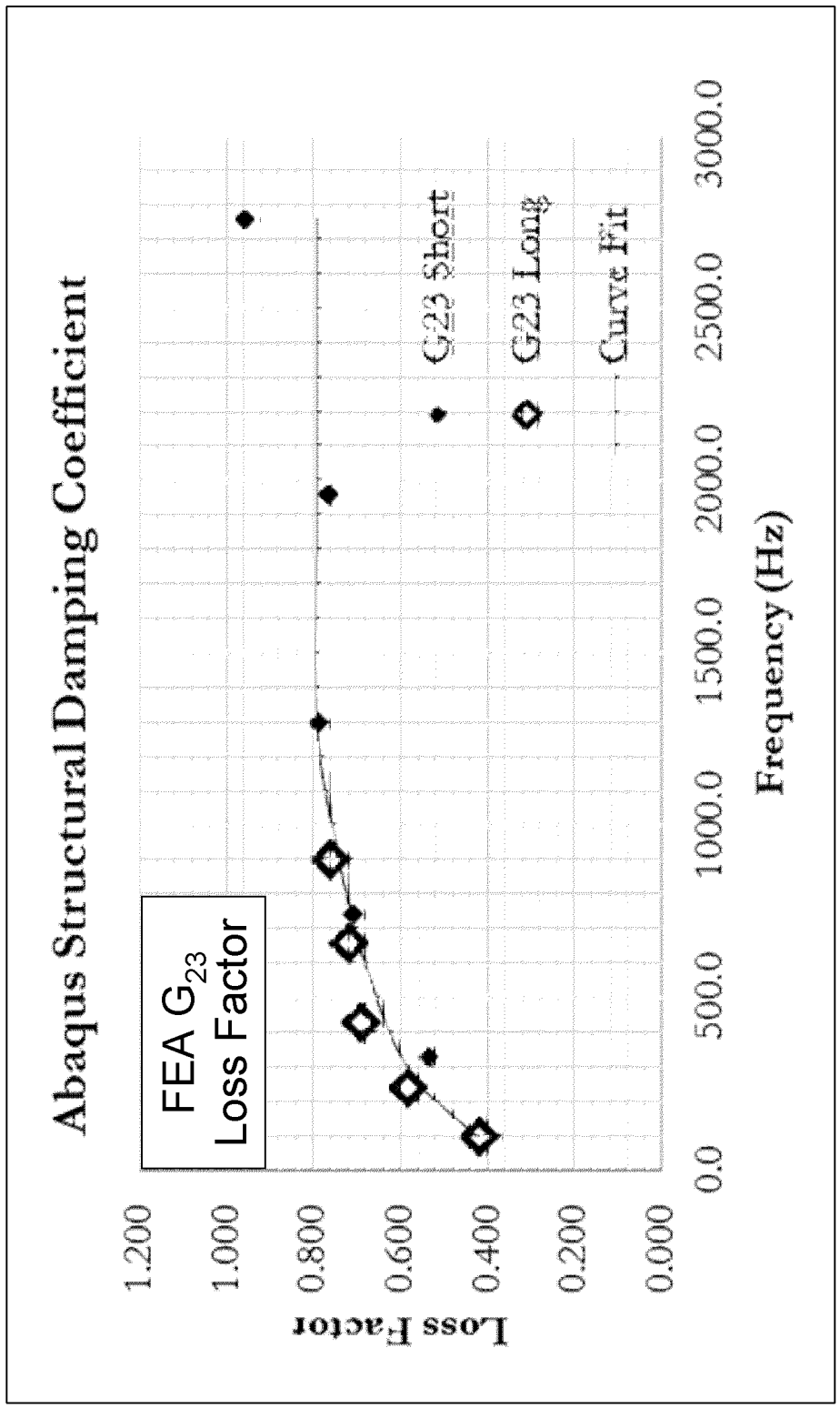
Figure 9A:
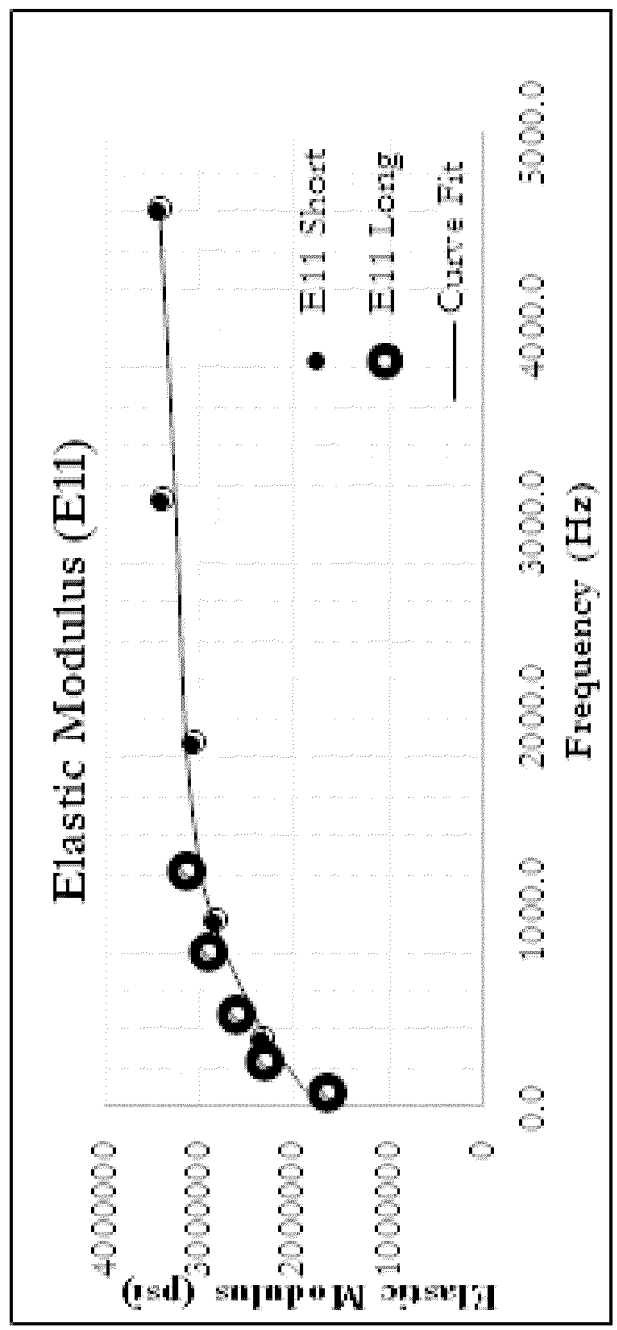
FIGS. 9A-9D show plots of dynamic Young's modulus ($E_{11}$) and loss factor as a function of frequency as measured with modal testing and finite element analysis (FEA)
Figure 9B:
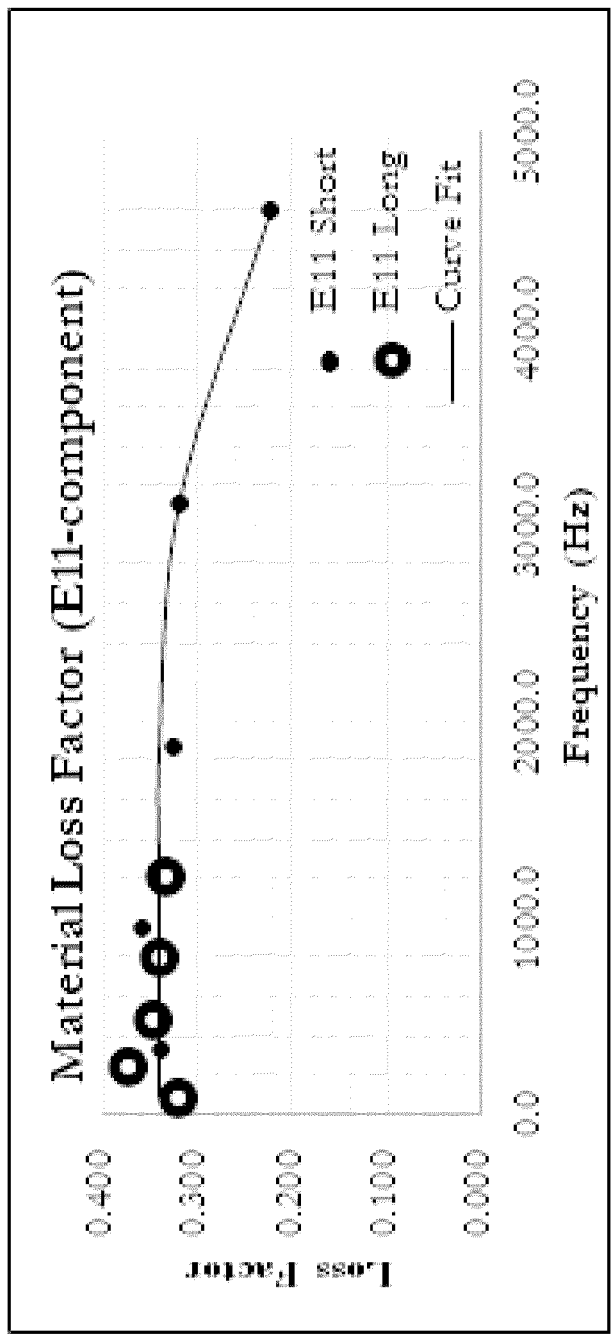
Figure 9C:
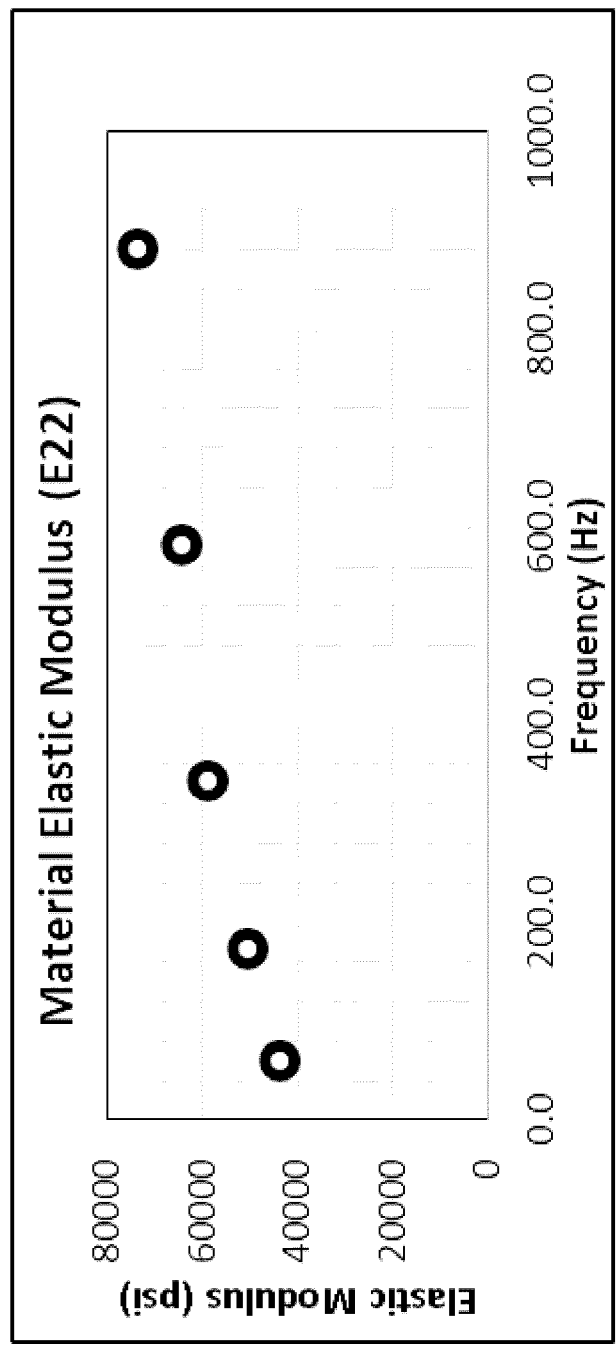
Figure 9D:
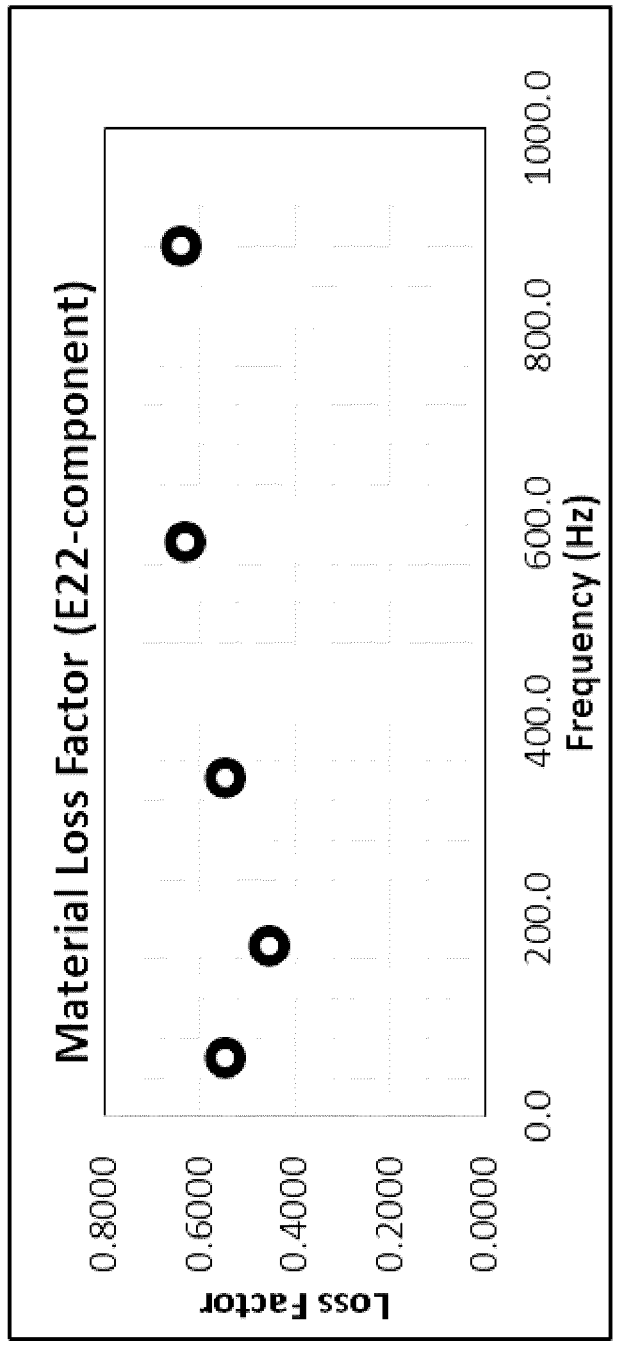

The modal testing was evaluated using finite element analysis to calculate the resulting shear modulus G' and loss factor. Finite element analysis was completed for both $G_{13}$ and $G_{23}$. The $G_{13}$ calculations are equivalent to the DMA testing of the composite with fibers oriented at about ±25° (FIG. 7). The $G_{23}$ calculations are equivalent to the DMA testing of the composite with fibers oriented at about ±65° (FIG. 8).

The $G_{13}$ calculation validates the DMA results for the composite with fibers oriented at ±25°. The $G_{13}$ shear modulus at the maximum loss factor calculated from the modal testing and finite element analysis is about 28% lower than the DMA results (e.g., about $2.50 \times 10^4$ psi as compared to about $3.46 \times 10^4$ psi). The modal testing and finite element analysis maximum $G_{13}$ loss factor is about 4% lower than the DMA results (e.g., about 0.64 as compared to about 0.67). The $G_{23}$ calculation validates the DMA results for the composite with fibers oriented at ±65°. The $G_{23}$ shear modulus at the maximum loss factor calculated from the modal testing and finite element analysis is about 7% greater than the DMA results (e.g., about $1.30 \times 10^4$ psi as compared to about $1.22 \times 10^4$ psi). The modal testing and finite element analysis maximum $G_{23}$ loss factor is about 4% greater than the DMA results (e.g., about 0.75 as compared to about 0.72).

Example 4

Modal Testing of Composite and Control Beams

Modal testing of composite beams and the control beams attached to aluminum beams is illustrated in FIG. 5. The composite included 11 plies (about 0.1" total thickness) of carbon fiber laminates, each having fibers oriented at about ±26° relative to the long axis of the composite. The composite was bonded to one side of an aluminum beam having dimensions of about 40"×4"×0.25" to provide an extensional damping configuration. The temperature was maintained at about 23° F. The fiber was a carbon fiber having a plain-weave configuration in a volume fraction of about 50%.

Control beams were prepared for two thermoplastic elastomers and uncoated aluminum. Thermoplastic elastomer state of the art damping tile sheets having an equivalent thickness of 0.1" were bonded on one side of an aluminum beam having dimensions of 40"×4"×0.25" (extensional damping configuration). The control beams further included uncoated aluminum beams having dimensions of 40"×4"×0.25".

FIG. 5 plots the system loss factor (damping material+aluminum beam) as a function of the natural frequency. As illustrated in FIG. 5, the polymer composite beam of the present disclosure exhibits a loss factor that is about 3 to 4 times greater than that of the TPE damping tile control beams and about 15 times greater than that of the uncoated aluminum beam. Furthermore, this result held approximately constant over the range of frequencies examined, about 10 to about 1100 Hz.

From these results, it may be concluded that embodiments of the composite system provide significantly improved damping performance over conventional elastomers. For example, by employing a composite having a maximum Young's loss factor greater than 0.15 and a real portion of the dynamic Young's modulus value E' greater than about $2 \times 10^5$ psi located at the frequency-of-maximum-Young's-loss-factor, the aluminum beam system loss factor with the composite was significantly higher than with the control thermoplastic elastomer damping tiles.

Furthermore, this increase was relatively constant over a relatively broad frequency range. This result demonstrates the importance of a relatively high modulus because the system loss factor remains relatively constant even as we observe an approximate 50% drop observed in the maximum loss factor when evaluated with a Dynamic Mechanical Analyzer. Rather, the Young's modulus of the composite increased enough to compensate for this effect. It is anticipated that similar performance benefits would also be observed in constrained configurations as well.

Example 5

Effects of Constraining Layer on System Loss Factor

Finite element studies were further performed to simulate the damping performance of embodiments of the disclosed composites that included relatively thin constraining layers interspersed between viscoelastic composite layers, and all these layers between two 2-inch thick carbon/epoxy constraining layers on the external surfaces. The simulated damping composites possessed the constitutive properties of a carbon-fiber reinforced polyurethane having a constraining layer of carbon-fiber reinforced epoxy attached to each face. The polyurethane composites had a thickness between about 1/16" to about 3/4" and the epoxy composites had a thickness ranging between about 0.03" to about 0.13". The loss factor of the polyurethane composites was assumed to be about 1 and the loss factor of the epoxy composite was assumed to be about 0. The simulated structure damped by the composite described above was assigned the constitutive properties of a carbon-fiber reinforced epoxy having a thickness of about 2".

Figure 6:
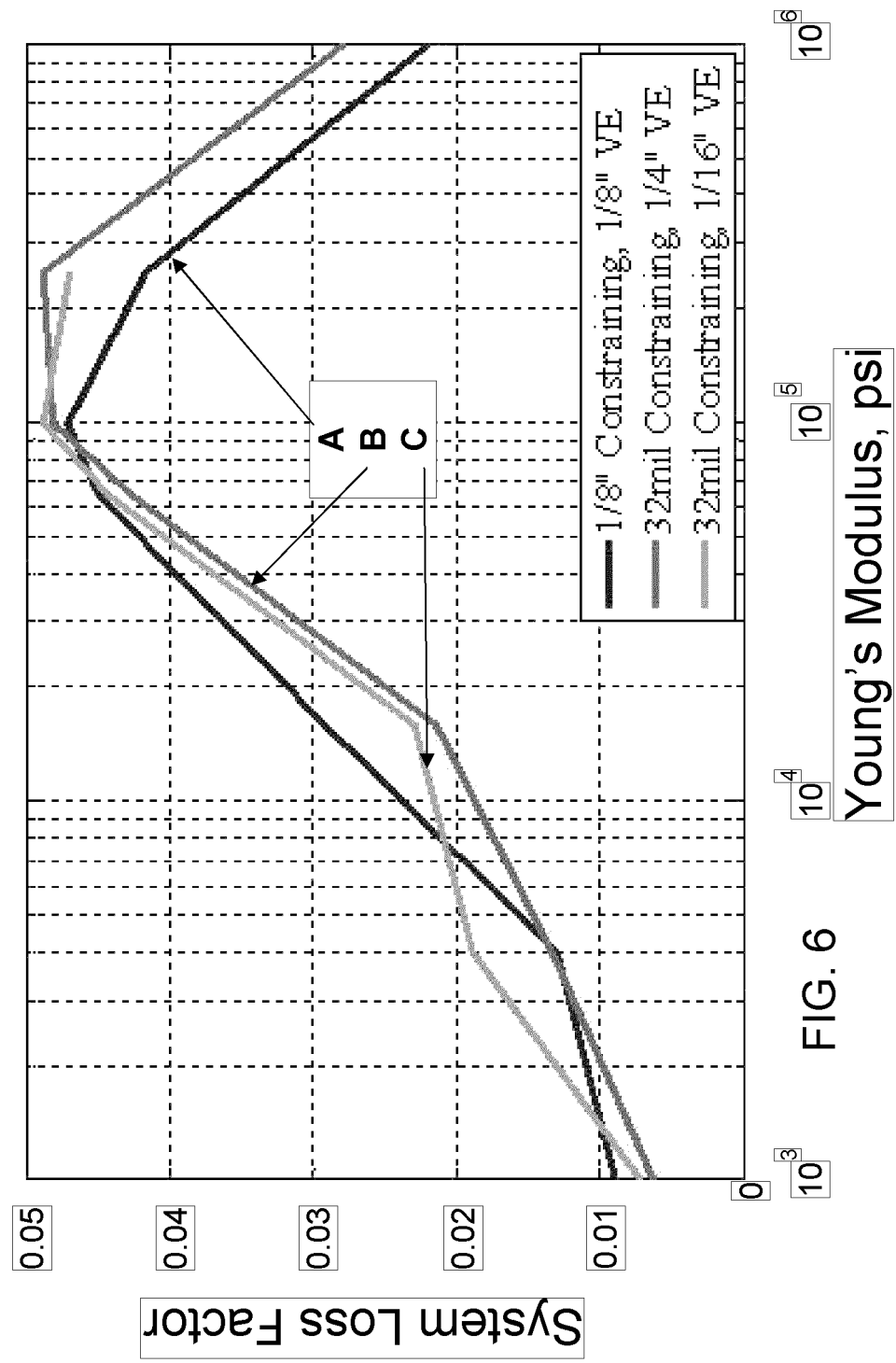
FIG. 6 is a plot of system loss factor as a function of dynamic Young's modulus for embodiments of the composite of FIG. 1 generated by finite element analysis.

The simulated system loss factor as a function of the Young's modulus of the damping composite is illustrated in FIG. 6. In one aspect, it may be observed that the system loss factor exhibits a peak in the range between about $1 \times 10^5$ psi to about $1.2 \times 10^5$ psi for each of the composites, irrespective of the thickness of the polyurethane and epoxy composites. Notably, this system loss peak lies within the ranges of composite modulus and loss factor identified to give significant improvement in the system loss factor.

The effect of the thickness of the fiber-reinforced elastomer composite on the system loss factor may be observed by comparison of composites B and C, which each have a constraining layer of about 0.03 inches and different thickness. It is observed that varying the thickness of the fiber-reinforced elastomer composite from about 1/16" to about 1/4" does not significantly influence the system loss factor. However, a modest shift in the modulus at which the loss factor peak occurs, from about $1.55 \times 10^5$ to about $1 \times 10^5$ is observed.

The effect of constraining layer thickness on the system loss factor may be further observed by comparison of composite A with composites B and C. Composite A has a constraining layer that is the same thickness as the underlying polyurethane composite. In contrast, the constraining layers of composites B and C, are relatively thinner than the underlying polyurethane composite. It is observed that the system loss factor of composite A, about 0.047, is modestly less than that of composites B and C, about 0.049. This result indicates that the constraining layer should be relatively thinner than the underlying fiber-reinforced elastomer composite.

Example 6

Optimum Dynamic Shear Modulus

Finite element studies were further performed to simulate the system damping performance of embodiments of the disclosed composites. The simulated damping composites possessed the constitutive properties of a carbon-fiber reinforced polyurethane. The loss factor of the polyurethane composite was assumed to be about 0.5 and the loss factor of the epoxy composite was assumed to be about 0. The simulated sandwich structure damped by the viscoelastic composite described above was assigned the constitutive properties of a carbon-fiber reinforced epoxy skins having a thickness of about 2".

Figure 10:
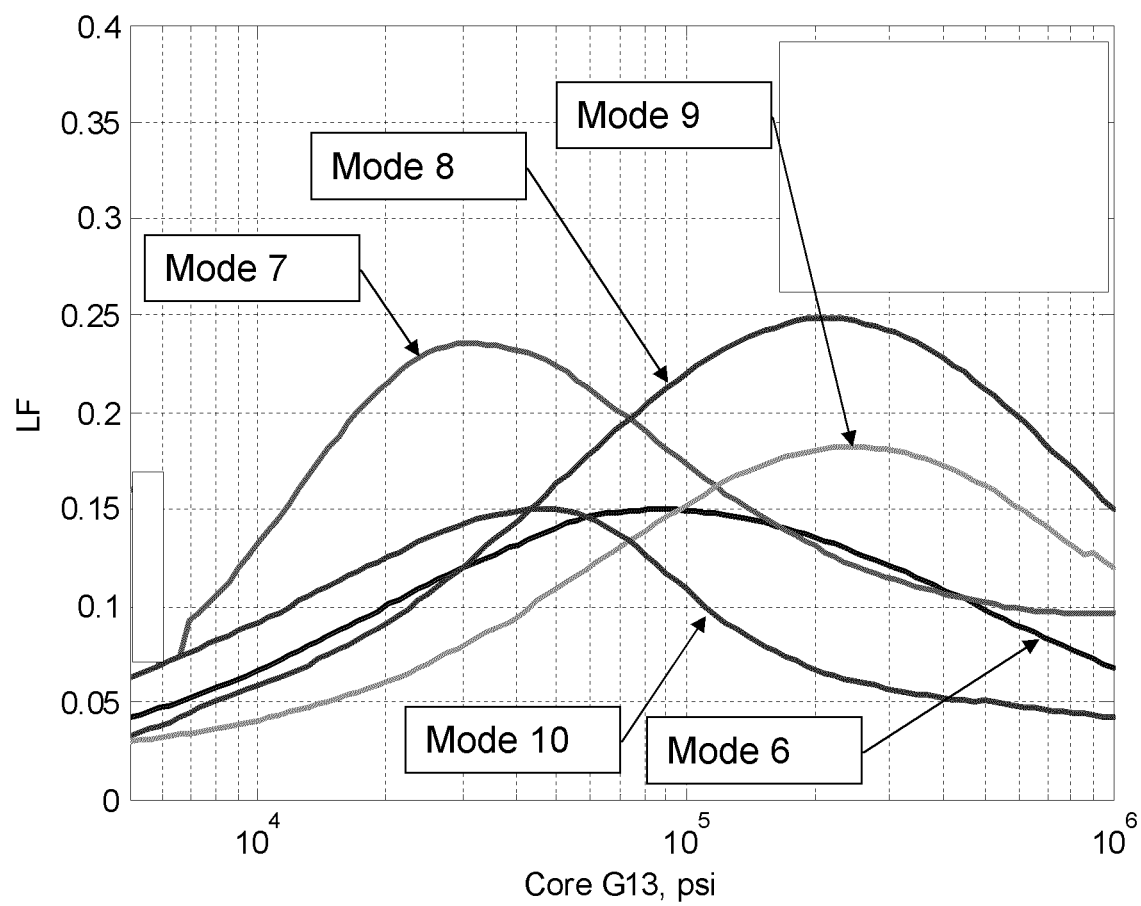
FIG. 10 is a sample plot of system loss factor as a function of dynamic shear modulus (G13) for a series of discrete modes within a composite sandwich structure with a carbon fiber reinforced polyurethane composite core between two carbon fiber reinforced epoxy constraining layers.

The simulated system loss factor for selected vibration modes are plotted as a function of the dynamic shear modulus (e.g., G13) of the polyurethane composite is illustrated in FIG. 10. In one aspect, it may be observed that each vibration mode has a different optimum dynamic shear modulus. In another aspect, it may be observed that the optimum shear modulus is greater than $1 \times 10^4$ psi for all selected modes (assuming constant material loss factor). Furthermore, it may be observed that the optimum shear modulus for these modes is beyond the range of state of the art homogeneous materials. In another aspect, it may be observed that certain applications demand exceptionally stiff viscoelastic materials to maximize system loss factor. Notably, these optimum shear modulus values lie within the ranges of viscoelastic composite shear modulus identified to give significant improvement in the system loss factor.

Example 7

Fiber Reinforced Laminates with Poisson's Ratio Above 0.5

Poisson's ratio studies were further performed to simulate the Poisson's ratio of the disclosed composite materials that include various fiber orientations, based on the carbon-fiber-reinforced polyurethane composites manufactured for example 2. FIG. 4A shows the dynamic shear modulus of the polyurethane matrix. These properties were input into a micromechanics simulation to calculate the dynamic Poisson's ratio of various configurations. Engineering calculations show this embodiment may have a Poisson's ratio greater than 0.5 for unidirectional fiber orientations ranging from about 1° to about 55° relative to a principle axis (e.g., the fiber axis).

FIGS. 4C through 4G show embodiments that possess a maximum shear loss factor greater than 0.5 and a real portion of the dynamic shear modulus value G' (e.g., $G_{13}$) greater than about $1 \times 10^4$ psi at the frequency-of-maximum-shear-loss-factor. FIG. 7 shows how the fiber architecture magnifies the real portion of the dynamic shear modulus by about 2500% relative to the matrix polymer (FIG. 4A) with a relatively small (e.g. about 60%) reduction in maximum loss factor relative to the matrix polymer (FIG. 4A). FIG. 10 illustrates the importance of a large dynamic shear modulus for certain system damping applications.

Example 8

Biaxial Fiber Reinforced Laminates with Poisson's Ratio Above 0.5

Poisson's ratio studies were further performed to simulate the Poisson's ratio of the disclosed composites that included various fiber orientations. Engineering calculations show carbon fiber reinforced polyurethane elastomer composites have a Poisson's ratio greater than 0.5 in the principle axis for biaxial fiber orientations (e.g., in the 1-2-plane) ranging from about ±1° to about ±55° relative to the principle axis (e.g. the 11-direction). Exceptional Poisson's ratios above about 2.5 may be achieved for biaxial fiber orientations angles ranging from about ±5° to about ±35° relative to the principle axis. A carbon fiber reinforced polyurethane elastomer with a fiber orientation about ±28° relative to the principle axis was manufactured and the dynamic Poisson's ratio (e.g., when measured at the center frequency) measured about 3.2 at the frequency of maximum shear loss factor. Furthermore, this orientation (i.e., ±28° fibers in 11-direction) that possesses the high Poisson's ratio has the higher out-of-plane shear modulus (i.e., G13). In contrast, the 22-direction has a lower Poisson's ratio and a lower (i.e., about 50% lower) out-of-plane shear modulus (i.e., G23).

This example shows how in-plane fiber architectures can influence out-of-plane properties. These examples demonstrate embodiments with exceptionally high Poisson's ratios relative to conventional materials.

These exceptionally high Poisson's ratios may induce a "strain magnification effect", which may result in a composite with exceptional damping performance (e.g. an effective combination of dynamic Young's modulus and Young's loss factor). The performances of certain embodiments are illustrated in FIG. 9 and FIG. 5, which is described in Example 3.

Example 9

Fiber Reinforced Laminate with Negative Coefficient of Linear Expansion

A carbon fiber reinforced polyurethane elastomer with a fiber orientation about ±25° relative to the principle axis was manufactured and tested. The coefficient of linear expansion in the principle axis measured about negative 5 microstrain per ° F. over a broad temperature range from 0° F. to 100° F., which is more negative than conventional materials. This example demonstrates unusual thermal expansion relative to conventional materials.

The terms "approximately," "about," and "substantially" as used herein represent an amount close to the stated amount that still performs a desired function or achieves a desired result. For example, the terms "approximately," "about," and "substantially" may refer to an amount that is within less than 10% of, within less than 5% of, within less than 1% of, within less than 0.1% of, and within less than 0.01% of the stated amount. Furthermore, ranges stated in terms of "about x to y" may be understood to include ranges of "about x to about y."

The term "room temperature" as used herein has its ordinary meaning as known to those skilled in the art and may include temperatures within the range of about 16° C. (60° F.) to about 32° C. (90° F.).

The term "elastomer" as used herein has its ordinary meaning as known to those skilled in the art and embodiments may include, but are not limited to, polyurethanes, polyureas, rubbers, thermoplastic elastomers, plasticized polymers, plasticized epoxies, elastomeric epoxies, silicones, polyvinyl chlorides, and combinations thereof. Elastomers may be considered as polymers existing above their glass transition temperature.

The term "fiber" as used herein has its ordinary meaning as known to those skilled in the art and may include one or more fibrous materials adapted for the reinforcement of composites. Fibers may take the form of whiskers, short fibers, continuous fibers, filaments, tows, bundles, sheets, plies, and combinations thereof. Fibers may further include any of wires, cables, rebar and rods, which fulfill the role of reinforcing fibers on a large scale. Continuous fibers may further adopt any of random, unidirectional, multi-dimensional (e.g., two- or three-dimensional), non-woven, woven, knitted fabrics, stitched, wound, and braided configurations, as well as swirl mat, felt mat, and chopped mat structures. Woven fiber structures may comprise a plurality of woven tows having less than about 1,000 filaments, less than about 3,000 filaments, less than about 6,000 filaments, less than about 12,000 filaments, less than about 24,000 filaments, less than about 48,000 filaments, less than about 56,000 filaments, and less than about 125,000 filaments. In further embodiments, the tows may be held in position by cross-tow stitches, weft-insertion knitting stitches, or a small amount of resin, such as a thermoplastic resin.

The composition of the fibers may be varied, as necessary. Embodiments of the fiber composition may include, but are not limited to, polymers, metals, and ceramics. For example, carbon, graphite, glass, E-glass, S-glass, aramid, quartz, polyethylene, polyester, fiberglass, thermoset, thermoplastic (polyethylene, ultra high molecular weight polyethylene (UHMW), polypropylene, nylon, etc.), polypropylenes, polyesters, Innegra®, Kevlar®, nylons, poly-p-phenylene-benzobisoxazole (PBO), boron, polyamide, silicon carbide, silicon nitride, Astroquartz®, Tyranno®, Nextel®, and Nicalon®, and combinations thereof.

The term "impregnate" as used herein has its ordinary meaning as known to those skilled in the art and may include the introduction of a matrix or resin material between or adjacent to one or more fibers. The matrix or resin may take the form of films, powders, liquids, and combinations thereof. Impregnation may be facilitated by the application of one or more of heat, pressure, and solvents.

The terms "cure" and "curing" as used herein have their ordinary meaning as known to those skilled in the art and may include polymerizing and/or cross-linking processes. Curing may be performed by processes that include, but are not limited to, heating, exposure to ultraviolet light, chemical reaction, and exposure to radiation. In certain embodiments, curing may take place within a polymer matrix or resin. Prior to curing, the matrix or resin may further comprise one or more compounds that are, at about room temperature, liquid, semi-solid, crystalline solids, and combinations thereof. In further embodiments, the matrix or resin may be partially cured in order to exhibit a selected stickiness or tack. In certain embodiments, consolidation and curing may be performed in a single process.

The term "damping" as used herein has its ordinary meaning as known to those skilled in the art and may include reduction in the amplitude of resonant vibrations by conversion of a portion of the mechanical energy of the vibration into thermal energy.

Although the foregoing description has shown, described, and pointed out the fundamental novel features of the present teachings, it will be understood that various omissions, substitutions, changes, and/or additions in the form of the detail of the apparatus as illustrated, as well as the uses thereof, may be made by those skilled in the art, without departing from the scope of the present teachings. Consequently, the scope of the present teachings should not be limited to the foregoing discussion but by a fair reading of the claims which follow.

What is claimed is:

1. A fiber-reinforced composite material comprising:
an elastomer, wherein the elastomer is selected from the group consisting of polyurethanes, polyureas, rubbers, thermoplastic elastomers, plasticized polymers, plasticized epoxies, elastomeric epoxies, silicones, and polyvinyl chlorides; and
a first plurality of fibers positioned within the elastomer, wherein the composite material simultaneously possesses a maximum shear loss factor greater than 0.5 and a shear storage modulus greater than $1\times10^4$ psi at a frequency of the maximum shear loss factor and at a temperature of 23 degrees Celsius, wherein the fiber-reinforced composite material has a Poisson's ratio greater than 0.5 in at least one direction, wherein a volume fraction of fibers is between about 40 percent and about 70 percent based on the total volume of the fiber-reinforced composite material, wherein each of the fibers in the first plurality of fibers is one of carbon or glass.

2. The composite material of claim 1, wherein the elastomer is a polyurethane.

3. The composite material of claim 1, wherein the first plurality of fibers has an architecture that is a braided fabric or a woven fabric.

4. The composite material of claim 1, wherein at least a first portion of the first plurality of fibers is oriented in a first direction and a second portion of the first plurality of fibers is oriented in a second direction, and wherein the first and second directions are about 90° with respect to each other.

5. The composite material of claim 1, wherein at least a first portion of the first plurality of fibers is oriented in a first direction and a second portion of the first plurality of fibers is oriented in a second direction, and wherein the first and second directions are within a range of about 30° to about 70° with respect to each other.

6. The composite material of claim 1, further comprising a plurality of plies including the first plurality of fibers, wherein the first plurality of fibers is oriented at + or −26 degrees relative to a long axis of the composite material.

7. The composite material of claim 6, wherein the composite material is bonded to a side of an aluminum structure.

8. A damping structure, comprising:
the fiber-reinforced composite of claim 1; and
at least one constraining layer possessing a static Young's modulus at least $1 \times 10^5$ psi.

9. The damping structure of claim 8, wherein the at least one constraining layer is positioned on at least a portion of an exterior surface of the fiber-reinforced composite.

10. The damping structure of claim 8, wherein the at least one constraining layer is formed from a material selected from a group consisting of metals, aluminum alloys, steel alloys, nickel alloys, polymers, ceramics, concrete, rebar, glass, plastics, thermoplastics, thermosets, fiber-reinforced composite materials, fiberglass/epoxy composites, fiberglass/polyester composites, carbon/polymer composites, and carbon/epoxy composites.

11. The damping structure of claim 8, wherein the fiber-reinforced composite material is placed between two constraining layers.

12. The damping structure of claim 8, wherein the at least one constraining layer comprises:
a matrix; and
a second plurality of fibers positioned within the matrix.

13. The damping structure of claim 12, wherein the matrix is selected from the group consisting of polymers, thermosets, thermoplastics, epoxies, polyesters, cyanate esters, vinyl esters, polyurethanes, polyvinyl chlorides, metals, aluminum alloys, ceramics, and concretes.

14. A fiber-reinforced composite material comprising:
a first elastomer, wherein the first elastomer is selected from the group consisting of polyurethanes, polyureas, rubbers, thermoplastic elastomers, plasticized polymers, plasticized epoxies, elastomeric epoxies, silicones, and polyvinyl chlorides;

a first plurality of fibers positioned within the first elastomer, wherein the composite material simultaneously possesses a maximum shear loss factor greater than 0.5 and a shear storage modulus greater than $1 \times 10^4$ psi at a frequency of the maximum shear loss factor and at a temperature of 23 degrees Celsius, wherein each of the fibers in the first plurality of fibers is one of carbon or glass;

a second elastomer affixed to the first elastomer, wherein the second elastomer is selected from the group consisting of polyurethanes, polyureas, rubbers, thermoplastic elastomers, plasticized polymers, plasticized epoxies, elastomeric epoxies, silicones, and polyvinyl chlorides; and a second plurality of fibers positioned within the second elastomer, wherein each of the fibers in the second plurality of fibers is one of carbon or glass, wherein the fiber-reinforced composite material has a Poisson's ratio greater than 0.5 in at least one direction, wherein a total volume fraction of the fibers is between about 40 percent and about 70 percent based on the total volume of the fiber-reinforced composite material.

15. The fiber-reinforced composite material of claim 14, further comprising a constraining layer affixed to the first elastomer, wherein the constraining layer is positioned on at least a portion of an exterior surface of the fiber-reinforced composite.

16. The fiber-reinforced composite material of claim 14, further comprising a second constraining layer affixed to the second elastomer.

* * * * *